US011483617B1

(12) United States Patent
Kalampoukas et al.

(10) Patent No.: US 11,483,617 B1
(45) Date of Patent: *Oct. 25, 2022

(54) AUTOMOTED IDENTIFICATION OF PRODUCT OR BRAND-RELATED METADATA CANDIDATES FOR A COMMERCIAL USING TEMPORAL POSITION OF PRODUCT OR BRAND-RELATED TEXT OR OBJECTS, OR THE TEMPORAL POSITION AND AUDIO, IN VIDEO FRAMES OF THE COMMERCIAL

(71) Applicant: Alphonso Inc., Mountain View, CA (US)

(72) Inventors: Lampros Kalampoukas, Brick, NJ (US); Ashish Chordia, Mountain View, CA (US); Zhengxiang Pan, Edison, NJ (US)

(73) Assignee: ALPHONSO INC., Mountain View, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 15/941,630

(22) Filed: Mar. 30, 2018

(51) Int. Cl.
*G06F 3/00* (2006.01)
*G06F 13/00* (2006.01)
(Continued)

(52) U.S. Cl.
CPC ....... *H04N 21/44008* (2013.01); *G06F 16/71* (2019.01); *G06V 20/41* (2022.01);
(Continued)

(58) Field of Classification Search
None
See application file for complete search history.

(56) References Cited

U.S. PATENT DOCUMENTS 8,340,498 B1 * 12/2012 Gill ........................ G11B 27/28
386/241
9,628,836 B1  4/2017 Kalampoukas et al.
(Continued)

OTHER PUBLICATIONS https://www.mediapost.com/publications/article/300332/at-the-end-of-a-tv-ad-use-your-logo-or-shot-of-yo.html at the End of a Tv Ad, Use Your Logo or Shot of Your Packaging? by Chuck Young, Columnist, May 3, 2017 (Year: 2017).*

(Continued)

*Primary Examiner* — Nasser M Goodarzi
(74) *Attorney, Agent, or Firm* — Panitch Schwarze Belisario & Nadel LLP

(57) ABSTRACT

A method and system are provided for assigning metadata candidates to a commercial by performing image analysis on a plurality of the video frames to identify video frames that include one or more of identifiable product-related logos, brand-related logos, product-related text, or brand-related text which appear in the video frames, capturing frame data for such video frames, categorizing a temporal position of the identified video frames within the commercial as being in either a beginning or ending portion of the commercial, or a middle portion of the commercial, and assigning to the commercial the identified products or brands as primary metadata candidates when the temporal position of the identified video frames within the commercial is in either the beginning or ending portion of the commercial.

4 Claims, 16 Drawing Sheets

(51) Int. Cl.
  H04N 5/445     (2011.01)
  H04N 21/44     (2011.01)
  H04N 21/81     (2011.01)
  H04N 21/431    (2011.01)
  H04N 21/83     (2011.01)
  G06F 16/71     (2019.01)
  G06V 20/40     (2022.01)

(52) U.S. Cl.
  CPC ....... *H04N 21/4312* (2013.01); *H04N 21/812* (2013.01); *H04N 21/83* (2013.01)

(56) References Cited

U.S. PATENT DOCUMENTS

| | | | |
|---|---|---|---|
| 10,182,256 B1* | 1/2019 | Kalampoukas | H04N 21/44008 |
| 2005/0094967 A1* | 5/2005 | Hatalsky | G11B 27/034 |
| | | | 386/283 |
| 2008/0260352 A1* | 10/2008 | Turner | H04N 5/76 |
| | | | 386/241 |
| 2016/0127800 A1* | 5/2016 | Weast | H04N 5/76 |
| | | | 725/32 |
| 2016/0261894 A1* | 9/2016 | Li | G06K 9/00711 |
| 2018/0218582 A1* | 8/2018 | Hodge | G06Q 40/08 |
| 2018/0278999 A1* | 9/2018 | David | H04N 21/4622 |

OTHER PUBLICATIONS

Wikipedia entry for "Automatic Content Recognition." downloaded from web page: https://en.wikipedia.org/w/index.php?title=Automatic_content_recognition&printable=yes, download date: Aug. 11, 2016, 4 pages.

Google Cloud Vision API, downloaded from webpage: http://cloud.google.com/vision/, download date: Feb. 23, 2018, 7 pages.

Microsoft® Azure Media Analytics on the Media Services Platform, publication date: Feb. 7, 2018, 4 pages.

Satterwhite, B.; Marques, O.; "Automatic Detection of TV Commercials." Potentials, IEEE, vol. 23, Issue 2, Apr.-May 2004 pp. 9-12.

* cited by examiner

| ID of commercial | Title | length | fingerprint(s) | storage location | primary metadata | secondary metadata |
|---|---|---|---|---|---|---|
| 44667799 | Toyota Camry commercial | 0:29 | | | | |
| 44667780 | Toyota Camry commercial | 0:58 | | | | |
| 44667781 | Toyota Camry commercial | 0:60 | | | | |
| 44667782 | Toyota Camry commercial | 0:30 | | | | |
| 44667783 | Toyota Camry commercial | 0:15 | | | | |
| 44667784 | GEICO commercial | 0:14 | | | | |
| 44667789 | GEICO commercial | 0:15 | | | | |
| 44667790 | GEICO commercial | 0:30 | | | | |
| 44667781 | Game of Thrones promo | 0:30 | | | | |
| ... | | | | | | |

Figure 3

Database of Brands and Products

| Text | Product and/or Brand | | Logo | Product and/or Brand |
|---|---|---|---|---|
| ... | ... | | ... | ... |

AUTOMOTED IDENTIFICATION OF PRODUCT OR BRAND-RELATED METADATA CANDIDATES FOR A COMMERCIAL USING TEMPORAL POSITION OF PRODUCT OR BRAND-RELATED TEXT OR OBJECTS, OR THE TEMPORAL POSITION AND AUDIO, IN VIDEO FRAMES OF THE COMMERCIAL

CROSS-REFERENCE TO RELATED APPLICATIONS

This application is related to the following copending U.S. Applications:

U.S. application Ser. No. 15/941,516 filed Mar. 30, 2018, entitled "AUTOMATED IDENTIFICATION OF PRODUCT OR BRAND-RELATED METADATA CANDIDATES FOR A COMMERCIAL USING PERSISTENCE OF PRODUCT OR BRAND-RELATED TEXT OR OBJECTS IN VIDEO FRAMES OF THE COMMERCIAL";

U.S. application Ser. No. 15/941,592 filed Mar. 30, 2018, entitled "AUTOMATED IDENTIFICATION OF PRODUCT OR BRAND-RELATED METADATA CANDIDATES FOR A COMMERCIAL USING DOMINANCE AND PROMINENCE OF PRODUCT OR BRAND-RELATED TEXT OR OBJECTS IN VIDEO FRAMES OF THE COMMERCIAL"; and U.S. application Ser. No. 15/941,650 filed Mar. 30, 2018, entitled "AUTOMATED IDENTIFICATION OF PRODUCT OR BRAND-RELATED METADATA CANDIDATES FOR A COMMERCIAL USING CONSISTENCY BETWEEN AUDIO AND IMAGE ELEMENTS OF PRODUCTS OR BRANDS DETECTED IN COMMERCIALS".

BACKGROUND OF THE INVENTION

Large databases of TV advertising commercials are currently maintained by many types of entities which use such databases for a myriad of purposes. Many of these databases are built by identifying TV advertising commercials in video data streams that are "aired" during a broadcast, or "streamed" during an internet-based viewing session. The video data stream typically does not contain any information regarding the product or brand that is advertised in the commercial, so these entities must extract such information from the audio and/or video of the commercial. Once extracted, this information is tagged as metadata and is stored in a database of "known commercials" that is used for a myriad of functions.

In one known process, a content processing platform uses any combination of automated, semi-automated and manual (human-aided) processes to determine if a particular video segment that has been identified as a potential commercial is actually a commercial. If so, the content processing platform tags the commercial with appropriate metadata and adds the commercial and its metadata to a library of known commercials. FIG. 3 of U.S. Pat. No. 9,628,836 (Kalampoukas et al.), which is incorporated by reference herein, shows an example of how commercials are stored with identification information and metadata. The metadata may include information such as the product and/or brand for the commercial (e.g., Toyota®, Camry®). Referring again to FIG. 3 of this patent, some of the metadata may also be used for the title of the advertisement. That is, an advertisement for a Toyota Camry may be tagged with the metadata of "Toyota" and "Camry" but is also titled "Toyota Camry Commercial." The title may be selected by a human or may be machine-generated.

Conventional metadata tagging involves a human watching the commercial and manually inputting the metadata. However, automated and semi-automated processes now exist for performing metadata identification, with human (manual) interaction being either eliminated or limited to spot-checking the automated process. Despite the new automated processes that have been recently introduced, there is still a need to improve the accuracy of the metadata identification process. The present invention fulfills such a need.

Prior art processes exist to analyze image frames and identify objects in the image frame. For example, the GOOGLE® Cloud Vision API provides image analytics capabilities that allows applications to see and understand the content within the images. The service enables customers to detect a broad set of entities within an image from everyday objects (e.g., "sailboat", "lion", "Eiffel Tower") to faces and product logos. However, simply knowing that an object or product logo is present in an image frame does not provide a sufficient degree of certainty that such information can be used for metadata tagging of a commercial, particularly, for "primary metadata." As defined herein, "primary metadata" is metadata regarding the commercial that directly identifies the product and/or brand being advertised in the commercial. As also defined herein, "secondary metadata" is any metadata regarding the commercial, other than the primary metadata. Secondary metadata is not necessarily stored in a database of commercials. However, depending upon how the database is used, it may be useful to store selected secondary metadata. Secondary metadata may include entities identified in the commercial which are not the product or the brand (e.g., roadway, sign, water), or it may be a product type or product category associated with the product or brand (e.g., vehicle, SUV).

Consider a Toyota Camry commercial that shows the vehicle driving past sailboats and the Eiffel Tower. Conventional image analytics such as the GOOGLE Cloud Vision API might identify the following five entities: sailboat, Toyota logo, Camry, Eiffel Tower and roadway. The Toyota logo and "Camry" may be identified using image comparison, logo detection, or optical character recognition (OCR). Products such as Microsoft® Azure Media Analytics can perform video OCR.

Conventional image analytics may also identify the Toyota Camry as simply being a "vehicle" or a "car." However, the conventional image analytics is not designed to identify the primary metadata for such a commercial, which is only "Toyota" and "Camry." The other identified entities, are, at best, secondary metadata, as defined herein. That is, "vehicle" or "SUV" is not the product and/or brand being advertised in the commercial, but could represent any one of a plurality of products and/or brands. Thus, there is still an unmet need to identify primary metadata among all of the detected metadata. The present invention fulfills such a need.

SUMMARY OF THE PRESENT INVENTION

A method and system are provided for assigning metadata candidates to a commercial by performing image analysis on a plurality of the video frames to identify video frames that include one or more of identifiable product-related logos, brand-related logos, product-related text, or brand-related text which appear in the video frames, capturing frame data for such video frames, categorizing a temporal position of the identified video frames within the commercial as being in either a beginning or ending portion of the commercial, or a middle portion of the commercial, and assigning to the commercial the identified products or brands as primary metadata candidates when the temporal position of the identified video frames within the commercial is in either the beginning or ending portion of the commercial.

BRIEF DESCRIPTION OF THE DRAWINGS

Preferred embodiments of the present invention will now be described by way of example with reference to the accompanying drawings:

FIGS. 3 and 4 are sample databases for use with the system of FIG. 2.

DETAILED DESCRIPTION OF THE INVENTION

Figure 1:
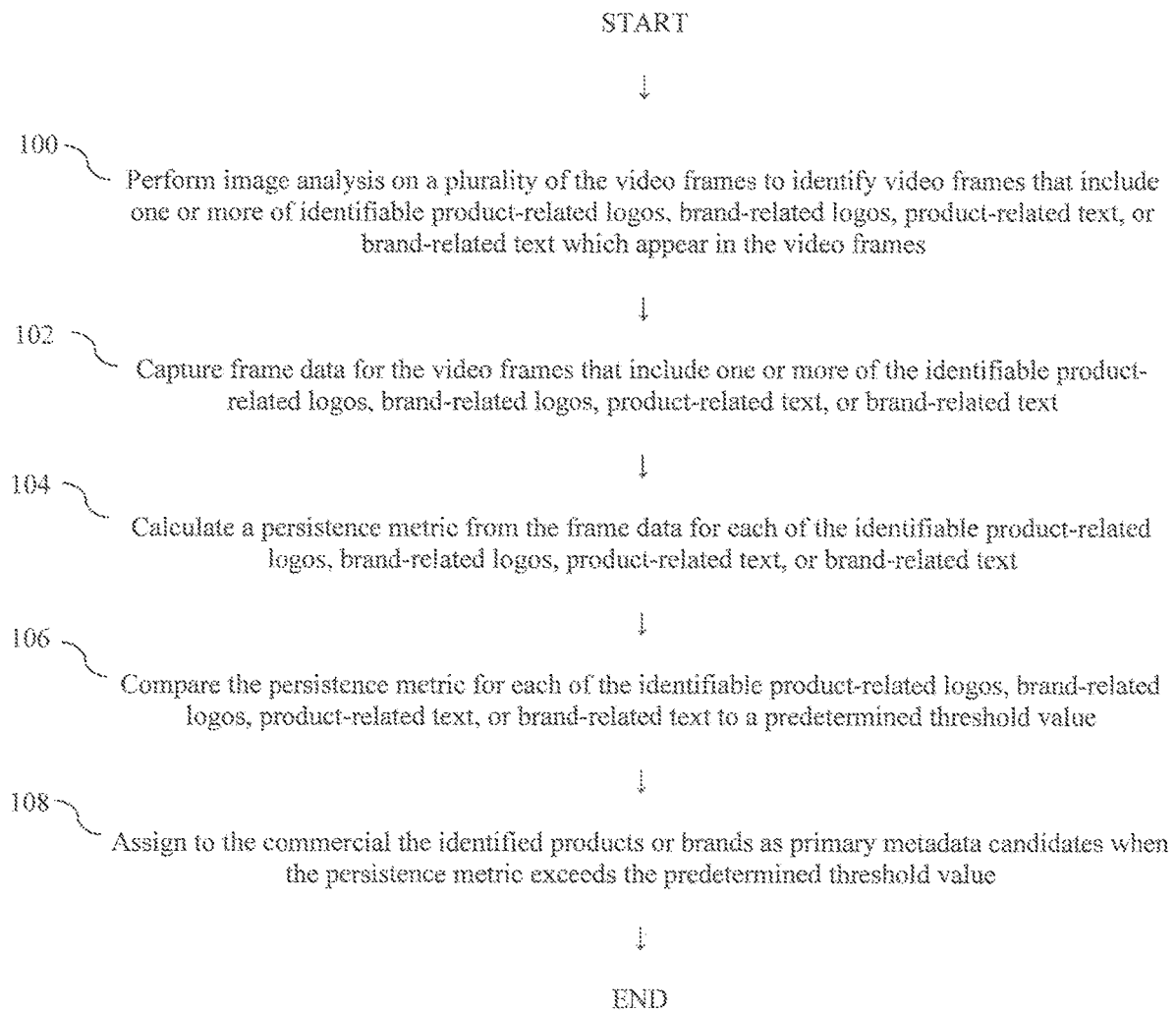
FIG. 1 is a flowchart for implementing a first preferred embodiment of the present invention.

Certain terminology is used herein for convenience only and is not to be taken as a limitation on the present invention.

The words "a" and "an", as used in the claims and in the corresponding portions of the specification, mean "at least one."

I. Definitions

The following definitions are provided to promote understanding of the present invention.

video data stream (also, referred to interchangeably as a "TV stream" and a "TV channel stream")—A video data stream includes (i) a conventional broadcast TV signal, typically delivered over a cable or fiber optic network via a set top box, CableCARD® or the like to a TV, (ii) an over-the-air (OTA) broadcast TV signal, and (iii) streaming services that deliver video content to a TV device that is connected to a viewer's home network. A video data stream may also be referred to as a "stream of audiovisual data" or an "audiovisual stream" since a video data stream typically includes audio.

segment (also, referred to interchangeably as a "content segment")—A segment is a portion of a video data stream that spans a time length. The segment includes the contents of the video data stream within that time length.

commercial (also, referred to interchangeably as an "advertisement" or "ad")—A "commercial" is an advertisement for a product or service, and also includes advertising for program type content, known in the TV industry as a "promo." A commercial is thus distinguishable from "program type content." An example of "program type content" is a TV show.

commercial break (also, referred to interchangeably as a "block of commercial content," "commercial block," "ad block," or "ad pod")—Each commercial break includes a plurality of successive individual commercials. That is, the commercials are aired back-to-back in a set or group. Commercial breaks are interspersed during a TV program. The total length of the commercial breaks aired during a TV show is almost always significantly shorter than the length of the TV show. Likewise, the length of one commercial break is almost always significantly shorter than the lengths of the TV show segments that precede and follow the commercial break. A typical broadcast TV channel airs about 20 minutes of commercial content per hour. One common format for a commercial break is to show national advertisements first, followed by regional/local advertisements, and concluding with promos.

clip—The video data stream may be clipped between a start time and a stop time so as to capture a segment of interest, typically a potential commercial that has not yet been identified.

primary metadata—"Primary metadata" is metadata regarding the commercial that directly identifies the product and/or brand being advertised in the commercial. Typically, the primary metadata identifies an entity that is associated with the sponsor of the commercial.

secondary metadata—"Secondary metadata" is any other metadata regarding the commercial other than the primary metadata. For example, in an advertisement for a Toyota vehicle, "Toyota" is the primary metadata, wherein "car," "vehicle," or "SUV" may be secondary metadata.

logo—a symbol, graphic mark, emblem, image, or other design used by a company to identify its products or brands. Logos are used to aid and promote public recognition. A logo may be of an abstract or figurative design or may include the text of the name it represents as in a logotype or wordmark.

text—words of something written or printed. In the context of a commercial, the "text" is any word or words that appear in an image frame, other than the word or words that appear in a logo. Text often appears in an overlay of the commercial, but text also includes a word or words that appear in the image frame, but not as part of an overlay. Image elements 6 and 7 in FIG. 7, which are discussed in more detail below, show examples of such overlaid text.

persistence metric—a persistence metric measures how long an initially identified entity continues to exist (i.e., persists) in a video segment, such as a commercial. In one preferred embodiment, the persistence metric is defined by a percentage of frames of the video segment that include the entity. In another preferred embodiment, the persistence metric is defined by a number of consecutively analyzed frames of the video segment that include the entity. Other ways of calculating a persistence metric are within the scope of the present invention. Weighting parameters can also be applied, wherein presence of the entity at the beginning or end of the video segment may be given more weight.

image element—an image element is any identifiable object in a video frame. The image element may be a logo by itself, or an image element that includes a logo (see definition of "logo" above), or may be a non-logo-related image element. Examples of logo-related image elements may a sign for "Toyota" or an entire vehicle that has a visible "Camry" logo on it. Examples of a non-logo-related image element include objects that may be classified as secondary metadata (e.g., "vehicle," "tree," "dog"). Identifiable logo-related image elements are also considered to be "product-related logos" or "brand-related logos."

Likewise, an image element may be "text" as defined above. A text-related image element may also be "product-related text" (e.g., the word "Camry") or "brand-related text" (e.g., the word "Toyota"), or non-product-related/non-brand-related text (e.g., the words "vehicle," "test-drive," "sale").

All image elements having product-related logos, brand-related logos, product-related text, or brand-related text are classified as being product-related or brand-related image elements, wherein the associated product or brand may be a potential candidate for either primary metadata or secondary metadata. All image elements having no product-related logos, brand-related logos, product-related text, or brand-related text are classified as being "non-product-related/non-brand-related image elements." These image elements are not potential candidate for either primary metadata or secondary metadata.

A typical video frame will usually have multiple identifiable image elements. Software for performing image element identification is discussed below.

dominance metric (also, referred to herein as a "relative size metric")—a dominance metric measures relative size of an image element in comparison to other image elements in the video frame. The dominance metric thus measures how strongly the image element "dominates" the video frame in comparison to the other image elements from a size perspective.

prominence metric—a prominence metric measures the absolute size of an image element in comparison with the entire image frame. The prominence metric thus measures the "prominence" of the image element within the video frame from a size perspective.

temporal metric—a temporal metric measures a time-related position of an identified entity in a video segment (e.g., a commercial), such as whether the entity exists in the beginning, ending, or middle portion of the commercial. The existence of the entity may be defined by a video presence and/or audio. For example, if the entity is "Toyota," the video may be a Toyota sign, logo or vehicle, and the audio may be the spoken word of "Toyota" or a Toyota vehicle, such as "Camry." The temporal metric may be defined by any suitable algorithm, such as by defining the beginning and ending portions as being the first and last x % of the length of the video segment, and the middle portion of the commercial is defined by the length of time between the first x % and last x % of the length of the commercial.

II. Detailed Disclosure

A. Persistence Metric

FIG. 1 is a flowchart of one preferred embodiment of the present invention that provides an automated method of identifying primary metadata candidates associated with a commercial and assigning the primary metadata candidates to the commercial, wherein the commercial is defined by video frames. In one preferred embodiment, the method operates as follows:

STEP 100: Perform image analysis on a plurality of the video frames to identify video frames that include one or more of identifiable product-related logos, brand-related logos, product-related text, or brand-related text which appear in the video frames. In one embodiment, the image analysis is performed on a sampled subset of the video frames in the commercial and the sampled subset of video frames is evenly sampled throughout the length of the commercial (e.g., every $10^{th}$ video frame). In another embodiment, the image analysis is performed on all of the video frames in the commercial. Other embodiments are within the scope of the present invention, such analyzing only a subset of video frames in the end portion of the commercial.

STEP 102: Capture frame data for the video frames that include one or more of the identifiable product-related logos, brand-related logos, product-related text, or brand-related text.

STEP 104: Calculate a persistence metric from the frame data for each of the identifiable product-related logos, brand-related logos, product-related text, or brand-related text.

STEP 106: Compare the persistence metric for each of the identifiable product-related logos, brand-related logos, product-related text, or brand-related text to a predetermined threshold value. In one embodiment, the persistence metric defines a percentage of frames that include the one or more of identifiable product-related logos, brand-related logos, product-related text, or brand-related text, and the predetermined threshold value is a frame percentage value for each identified product or brand. In another embodiment, the persistence metric defines a number of consecutively analyzed frames that include the one or more of identifiable product-related logos, brand-related logos, product-related text, or brand-related text, and the predetermined threshold value is a minimum number of consecutive frames for each identified product or brand.

STEP 108: Assign to the commercial the identified products or brands as primary metadata candidates when the persistence metric exceeds the predetermined threshold value.

Figure 2:
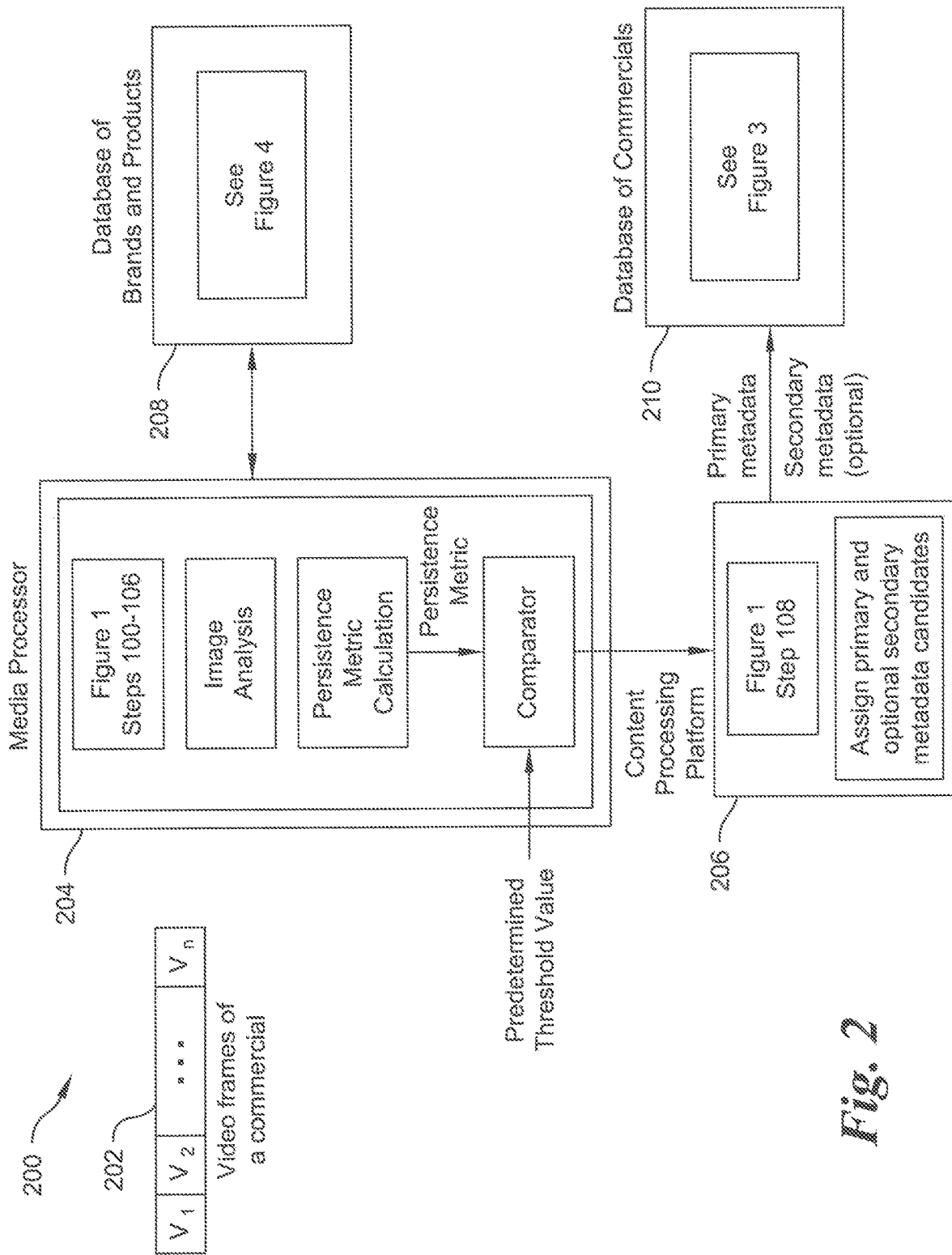
FIG. 2 is a schematic diagram of a system for implementing the preferred embodiment shown in FIG. 1.

FIG. 2 shows one preferred embodiment of a system 200 for implementing the process described above. Video frames ($V_1, V_2, \ldots V_n$) of commercial 202 are received by a media processor 204 which implements steps 100-106 described above with respect to FIG. 1. The media processor 204 interacts with a database 208 of brand and product data to perform the image analysis of step 100, as described in further detail below. The media processor 204 further performs a comparison of the persistence metric to a predetermined threshold value. The content processing platform then assigns primary metadata candidates to the commercial when the persistence metric exceeds the predetermined threshold value (step 108 of FIG. 1). One of the functions of a conventional content processing platform is to verify that a video segment that was previously flagged as being a potential commercial is, in fact, a commercial, and then to assign metadata to the commercial using any combination of automated, semi-automated, or manual processes. However, in one preferred embodiment of the present invention, the video segment is presumed to be a commercial based on previous analysis using known techniques. Here, the content processing platform 206 still assigns at least the primary metadata as a result of the process described herein.

FIG. 3 shows a sample database of commercials 210 that includes fields for assigning an ID of the commercial, Title, length, fingerprint(s), storage location, primary metadata, and, optionally, secondary metadata. The primary metadata resulting from the process implemented in FIGS. 1 and 2 populates the primary metadata field.

Referring again to FIG. 2 and step 100 of FIG. 1, the media processor 204 performs image analysis on a plurality of the video frames to identify video frames that include one or more of identifiable product-related logos, brand-related logos, product-related text, or brand-related text which appear in the video frames. Conventional software, such GOOGLE® Cloud Vision API may be used for such a purpose. As is well-known in the art, a database of entities must be provided to perform this function. Here, the database 208 of brands and products is used. Thus, for a product-related logo, brand-related logo, product-related text, or brand-related text to be "identifiable," it should appear somewhere in either the "text" or "logo" columns of the database 208.

FIG. 4 shows the contents and structure of the database 208. The database 208 includes at least the following types of entities:

1. text associated with brands and products and the related brand and/or product.
2. logos associated with brands and products and the related brand and/or product. The logos are stored as image files.

While the database is structured with separate table entries for text and logos and their associated product and/or brand, the database may also have a single column of "text and logos" and a single column of the associated product and/or brand.

In an example of the image analysis, if the text "Camry" is detected in a video frame, the table in the database 208 associates this text with the product "Camry" and the brand "Toyota." In some instances, the text may not be the actual product or brand, but is clearly associated with a particular product or brand in the consumer market, that it serves as a proxy for the text of a product or brand. Abbreviated words and alternative or slang expressions are two such examples (e.g., "Mickey D's" refers to the brand "McDonald's," "BK" refers to the brand "Burger King," "DQ" refers to the brand "Dairy Queen") However, in most situations, the text itself will be directly equivalent to the product or brand. Text may be detected within images either directly, such as text in an overlay, or using OCR if the text is embedded in an image, such as a sign.

Product or brand logos (e.g., Toyota logo, GEICO® gecko), are likewise detected in a video frame and associated with the corresponding product or brand.

The database 208 preferably contains the most recognizable text and logos associated with the major commercial brands and products that advertise in video-based media.

This image analysis process automatically weeds out any detected text or objects in an image that are not associated with a product or brand. Thus, if the image analysis detects any text or objects that are not in the database 208, it can be presumed that such text or objects are not potential primary metadata. However, such text and objects may be flagged as secondary metadata, if desired. For example, it may be desirable to build a database that allows someone to search for all commercials that show brand-identifiable vehicles, but not necessarily a particular brand of vehicle. The same object may result in entries for both primary and secondary metadata. For example, a Toyota Camry may be detected and identified by its brand/product (primary metadata), as well as for being a "vehicle" (secondary metadata).

As discussed above, the mere existence of text or a logo that is associated with a product or brand is not sufficient, by itself, to flag the product or brand as primary metadata. Consider, for example, an automobile advertisement for the Toyota Camry paid for and sponsored by Toyota that compares the Toyota Camry to its main marketplace competitor, namely, the Honda® Accord®. If an actual Honda Accord appears in the commercial, it will likely be identified by the image analysis process. However, the primary metadata should not include either "Honda" or "Accord," since neither of these brands or products are the product or brand sponsor of the commercial. In most instances where competitive advertising of this nature occurs, the company whose product is being promoted will typically devote significantly more "air time" to showing the company's product compared to the competitor's product. Thus, in most instances, the use of the persistence metric will weed out any potential false identifications of primary metadata.

Consider the following example for analysis of a commercial similar to the one described above.

Persistence metric calculation:
A. Total frame percentage calculation
10% of the video frames in the captured frame data include a brand-related logo for "Toyota"
6% of the video frames in the captured frame data include product-related text for "Camry"
2% of the video frames in the captured frame data include a brand-related logo for "Honda."
2% of the video frames in the captured frame data include product-related text for "Accord"
B. Consecutive frame number calculation
150 consecutive video frames in the captured frame data include a brand-related logo for "Toyota"
120 consecutive video frames in the captured frame data include product-related text for "Camry"
20 consecutive video frames in the captured frame data include a brand-related logo for "Honda"
17 consecutive video frames in the captured frame data include product-related text for "Accord"

Rule 1: Declare primary metadata candidate when more than 5% of the video frames in the captured frame data include one or more of identifiable product-related logos, brand-related logos, product-related text, or brand-related text.

Result of Rule 1: "Toyota" and "Camry" are identified as primary metadata candidates and "Honda" and "Accord" are not identified as primary metadata candidates. If desired by the database provider, "Honda" and "Accord" may be flagged and stored as secondary metadata candidates.

Rule 2: Declare primary metadata candidate when at least 100 consecutive video frames in the captured frame data include one or more of identifiable product-related logos, brand-related logos, product-related text, or brand-related text.

Result of Rule 2: Same as Rule 1.

In this example, the same result occurred with both rules. The number of rules that are used and the Boolean operation(s) that are applied to them (i.e., AND, OR) is a design choice and the scope of the invention includes any such arrangements of rules.

B. Prominence Metric

As defined above, a prominence metric measures the absolute size of an image element in comparison with the entire image frame.

Figure 5:
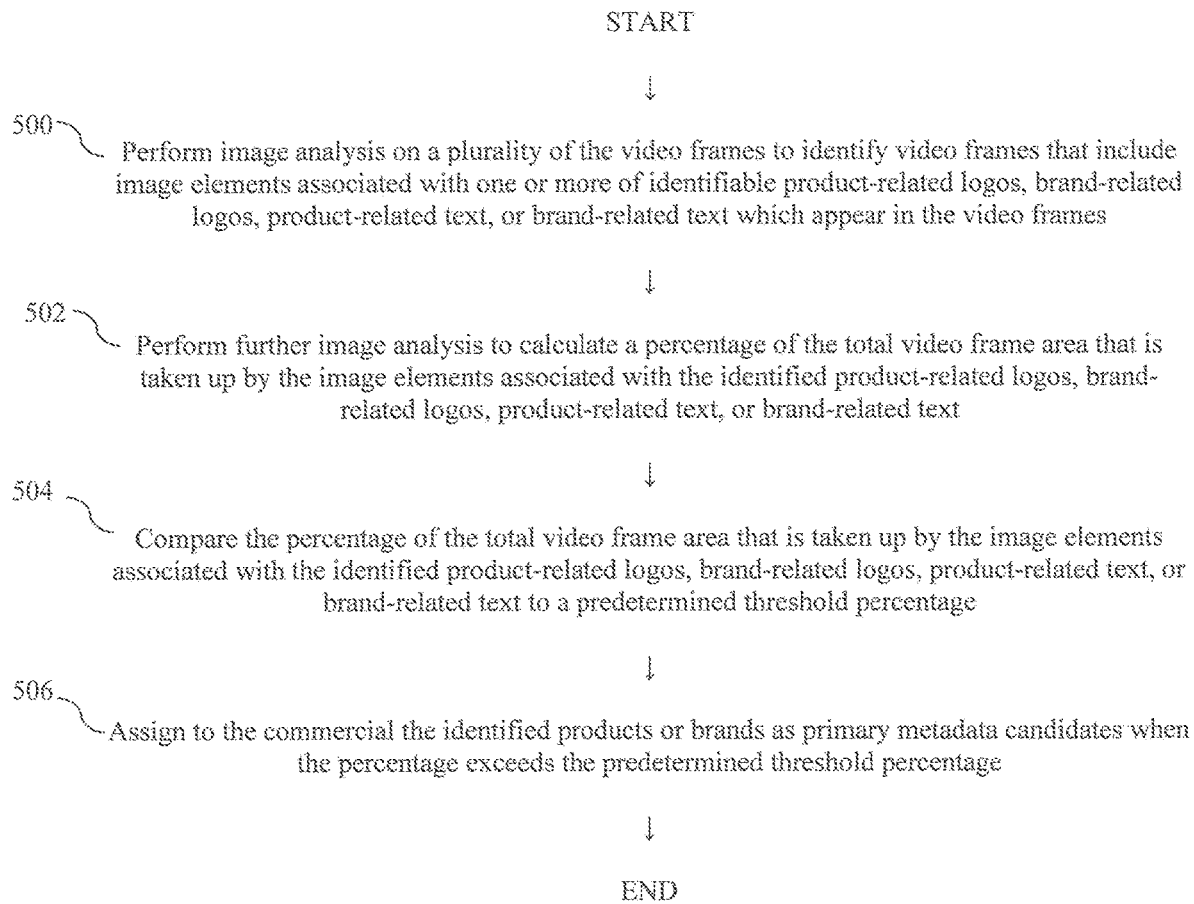
FIG. 5 is a flowchart for implementing a second preferred embodiment of the present invention.

FIG. 5 is a flowchart of one preferred embodiment of the present invention that employs the prominence metric to identify primary metadata candidates associated with a commercial and assign the primary metadata candidates to the commercial, wherein the commercial is defined by video frames. In one preferred embodiment, the method operates as follows:

STEP 500: Perform image analysis on a plurality of the video frames to identify video frames that include image elements associated with one or more of identifiable product-related logos, brand-related logos, product-related text, or brand-related text which appear in the video frames.

STEP 502: Perform further image analysis to calculate a percentage of the total video frame area that is taken up by the image elements associated with the identified product-related logos, brand-related logos, product-related text, or brand-related text. (This is the prominence metric calculation.)

STEP 504: Compare the percentage of the total video frame area that is taken up by the image elements associated with the identified product-related logos, brand-related logos, product-related text, or brand-related text to a predetermined threshold percentage.

STEP 506: Assign to the commercial the identified products or brands as primary metadata candidates when the percentage exceeds the predetermined threshold percentage.

Regarding steps 500 and 502, the image analysis may be performed on all of the video frames in the commercial, or on a sampled subset of the video frames in the commercial. The sampled subset of video frames may be evenly sampled throughout the length of the commercial. Other embodiments are within the scope of the present invention, such analyzing only a subset of video frames in the end portion of the commercial.

Figure 6:
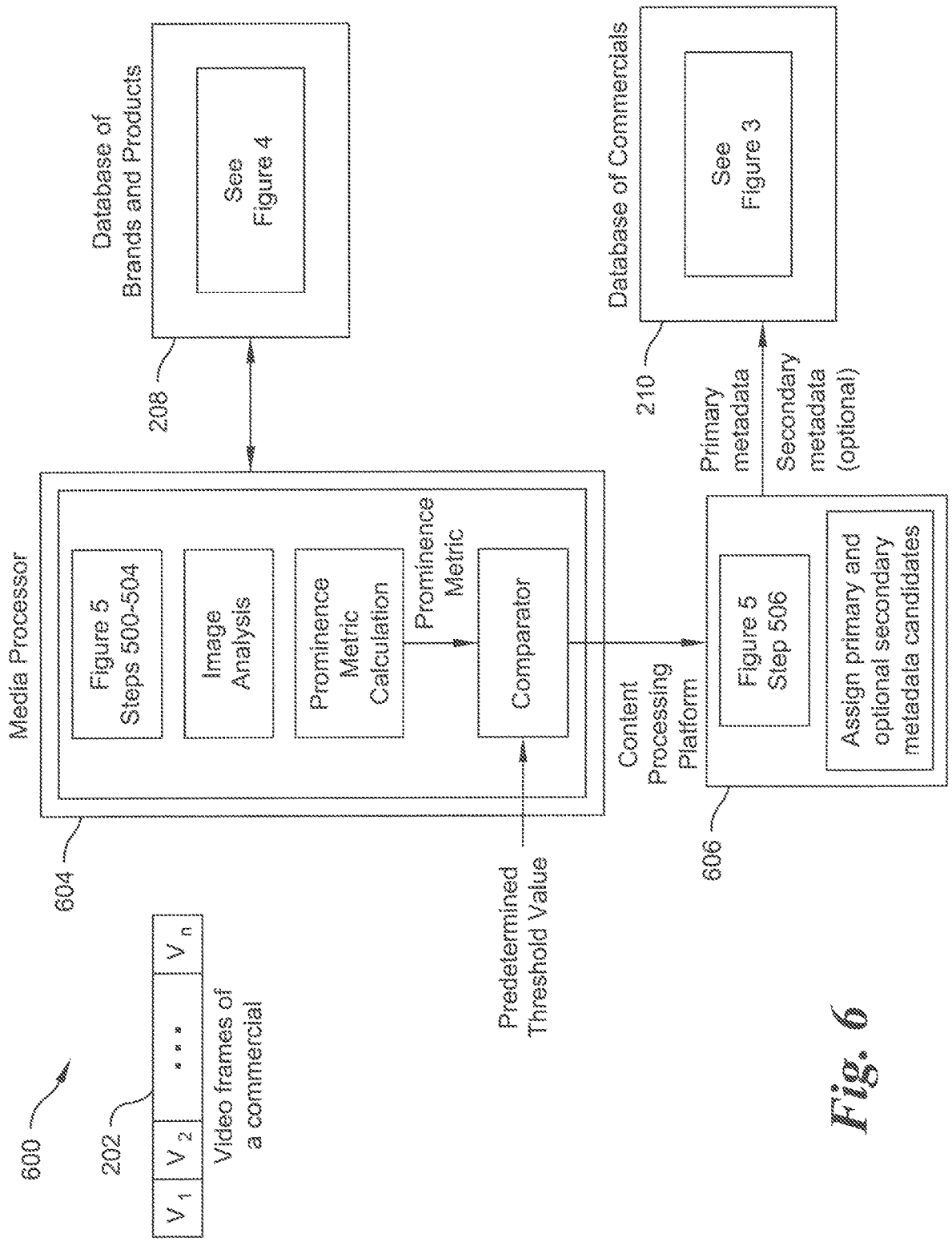
FIG. 6 is a schematic diagram of a system for implementing the preferred embodiment shown in FIG. 5.

FIG. 6 shows one preferred embodiment of a system 600 for implementing the process described above. Video frames ($V_1, V_2, \ldots V_n$) of commercial 202 are received by a media processor 604 which implements steps 500-504 described above with respect to FIG. 5 to calculate the prominence metric and perform the comparison to the predetermined threshold percentage. The media processor 604 interacts with the database 208 of brand and product data shown in FIG. 4 to perform the image analysis of step 500. A content processing platform 606 then assigns a primary metadata candidate to the commercial when the prominence metric exceeds the predetermined threshold percentage (step 506 of FIG. 5). As discussed above, one of the functions of a conventional content processing platform is to verify that a video segment that was previously flagged as being a potential commercial is, in fact, a commercial, and then to assign metadata to the commercial using any combination of automated, semi-automated, or manual processes. However, in one preferred embodiment of the present invention, the video segment is presumed to be a commercial based on previous analysis using known techniques. Here, the content processing platform 606 still assigns at least the primary metadata as a result of the process described herein.

The primary metadata resulting from the process implemented in FIGS. 5 and 6 populates the primary metadata field in the same database 210 shown in FIG. 3.

Referring again to FIG. 6 and step 500 of FIG. 5, the media processor 604 performs image analysis on a plurality of the video frames to identify video frames that include one or more of identifiable product-related logos, brand-related logos, product-related text, or brand-related text which appear in the video frames. Conventional software, such GOOGLE Cloud Vision API and the database 208 of FIG. 4 may be used for such a purpose in the same manner as described above with respect to the persistence metric embodiment.

The prominence metric may be expressed in a plurality of different ways, and the scope of the present invention is not limited to any particular way. However, for illustrative purposes, one algorithm that may be used is as follows:

1. Identify image elements in a video frame that have product-related logos, brand-related logos, product-related text or brand-related text.

2. Calculate the percentage of total video frame area that is taken up by each of these identified image elements. The prominence metric in this example is a percentage value.

For example, it may be determined that a particular image element having a product-related logo, such as a Toyota sign, takes up 30% of the image frame (total video frame area), whereas another image element having a product-related logo, such as the Honda vehicle, may only take up 5% of the video frame (total video frame area). The prominence metric can then be used to identify primary metadata candidates by comparing the prominence metric to a predetermined threshold percentage.

Figure 7:
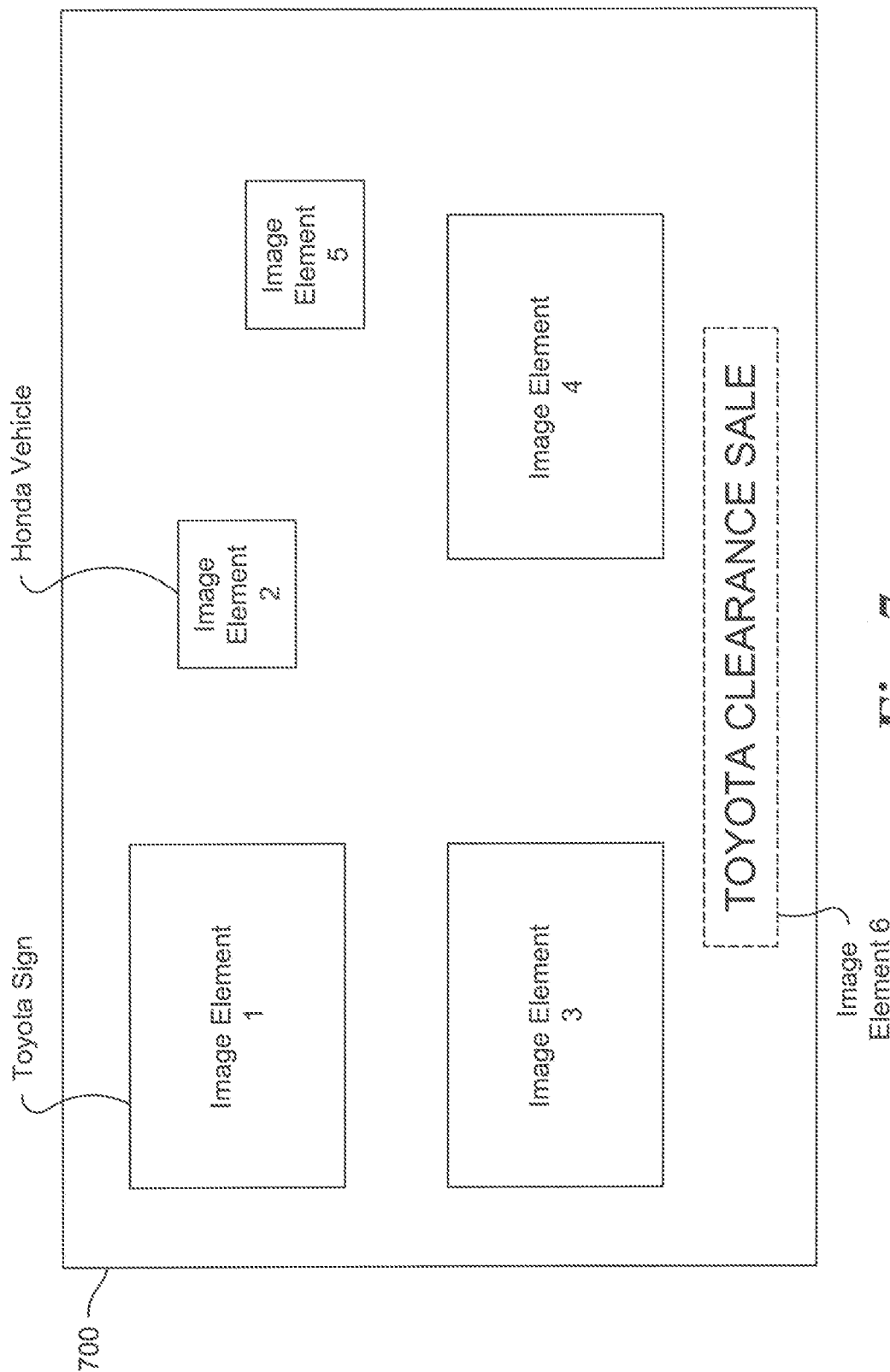
FIG. 7 is a video image frame for illustrating features of the preferred embodiment shown in FIGS. 5 and 6.

FIG. 7 shows an image frame 700 that illustrates this example, wherein the Toyota sign is labeled as "image element 1" and the Honda vehicle is labeled as "image element 2." Other image elements were also identified in this video frame, labeled as "image element 3," "image element 4," and "image element 5," but these image elements are not associated with a product or brand, and thus are considered "non-logo-related" image elements. Image element 6 is overlaid text, and is discussed below.

Consider the following sample rule:

Rule: Declare primary metadata candidate when more than 25% of the image frame (total video frame area) includes image elements associated with one or more of identifiable product-related logos, brand-related logos, product-related text, or brand-related text.

Result of Rule: "Toyota" is identified as a primary metadata candidate (30% is greater than 25%) and "Honda" is not identified as a primary metadata candidates (5% is not greater than 25%). If desired by the database provider, "Honda" may be flagged and stored as a secondary metadata candidate.

FIG. 7 actually shows two image elements that include the brand "Toyota," namely, image elements 1 and 6. Thus, the total video frame area for purposes of the percentage calculation includes the combined total video frame area of these two image elements, which is even greater than the 30% area of image element 1. In this example, the result is the same, since the percentage of the total video frame area of image element 1 already exceeds the predetermined threshold percentage.

Overlaid text can be treated in any number of ways by the image analysis. In one preferred embodiment, the image analysis identifies overlaid text that is deemed to be part of the same block of overlaid text (e.g., Toyota Clearance Sale") and treats the entire block as a single image element, while testing all of the words in the image block for potential product-related text or brand-related text. The total video frame area of the block of overlaid text is then used in the calculations described above. Alternatively, the block of overlaid text is broken up into individual words, which are then individually tested for potential product-related text or brand-related text, and the total video frame area of each word is then used in the calculations described above.

The overlaid text also adds complexity to the total video frame area calculations because it results in a total video frame area being greater than 100%. If the overlay hypothetically covers the entire video frame area, then the total video frame area would be 200% of the base image area. In one preferred embodiment, the total video frame area is calculated to be 100% plus the total video frame area of the overlaid image elements. The percentage calculations are then performed using the adjusted total video frame area.

The exact algorithm and the ideal predetermined threshold percentage are selected so as to yield sufficiently acceptable results.

C. Relative Size (Dominance) Metric

As defined above, a dominance metric measures relative size of an image element in comparison to other image elements in the video frame.

Figure 8:
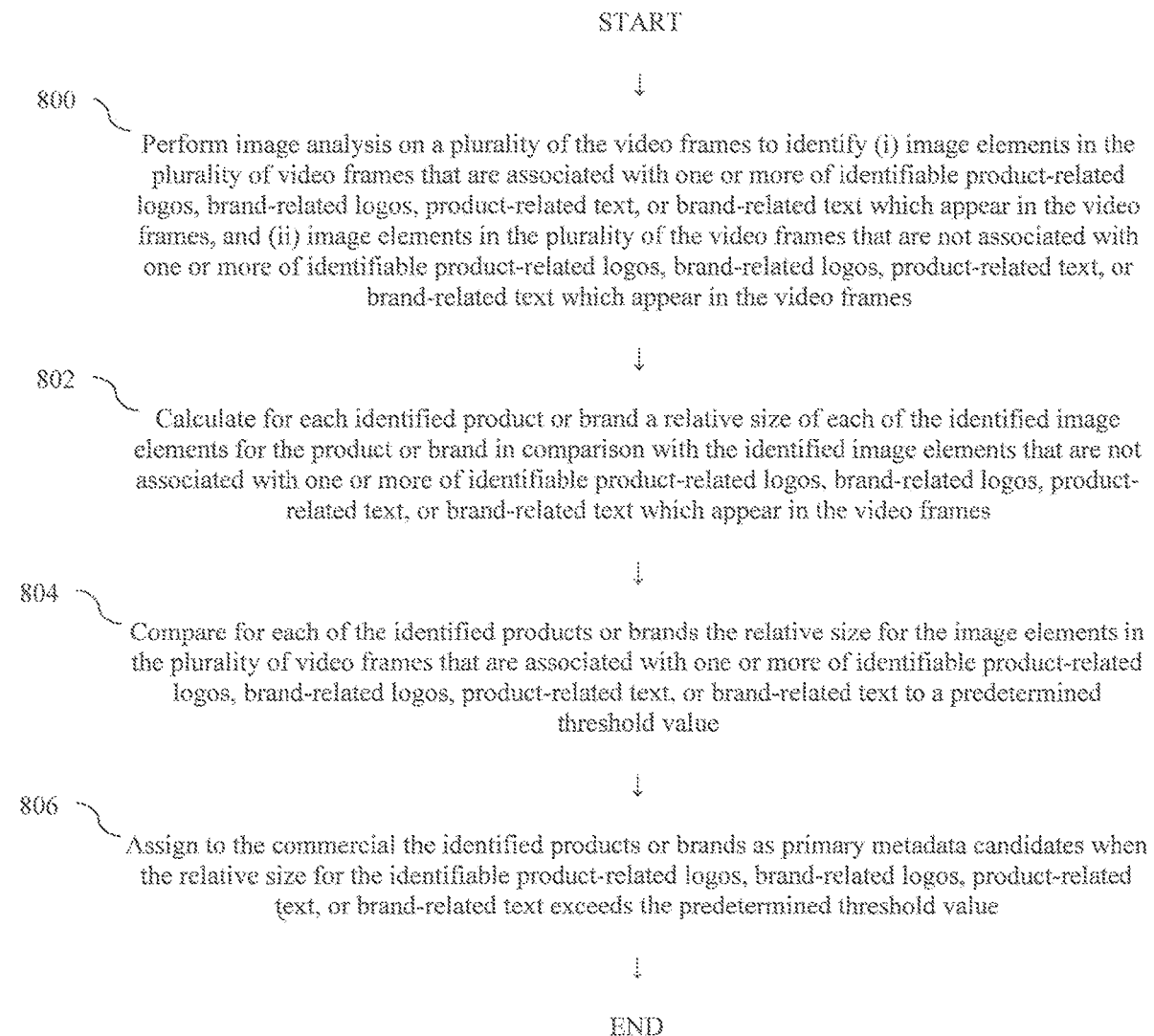
FIG. 8 is a flowchart for implementing a third preferred embodiment of the present invention.

FIG. 8 is a flowchart of one preferred embodiment of the present invention that employs the dominance metric to identify primary metadata candidates associated with a commercial and assign the primary metadata candidates to the commercial, wherein the commercial is defined by video frames. In one preferred embodiment, the method operates as follows:

STEP 800: Perform image analysis on a plurality of the video frames to identify the following items:
  i. image elements in the plurality of video frames that are associated with one or more of identifiable product-related logos, brand-related logos, product-related text, or brand-related text which appear in the video frames, and
  ii. image elements in the plurality of the video frames that are not associated with one or more of identifiable product-related logos, brand-related logos, product-related text, or brand-related text which appear in the video frames.

STEP 802: Calculate for each identified product or brand a relative size of each of the identified image elements for the product or brand in comparison with the identified image elements that are not associated with one or more of identifiable product-related logos, brand-related logos, product-related text, or brand-related text which appear in the video frames.

STEP 804: Compare for each of the identified products or brands the relative size for the image elements in the plurality of video frames that are associated with one or more of identifiable product-related logos, brand-related logos, product-related text, or brand-related text to a predetermined threshold value.

STEP 806: Assign to the commercial the identified products or brands as primary metadata candidates when the relative size for the identifiable product-related logos, brand-related logos, product-related text, or brand-related text exceeds the predetermined threshold value.

Regarding step 800, the image analysis may be performed on all of the video frames in the commercial, or on a sampled subset of the video frames in the commercial. The sampled subset of video frames may be evenly sampled throughout the length of the commercial. Other embodiments are within the scope of the present invention, such analyzing only a subset of video frames in the end portion of the commercial.

Figure 9:
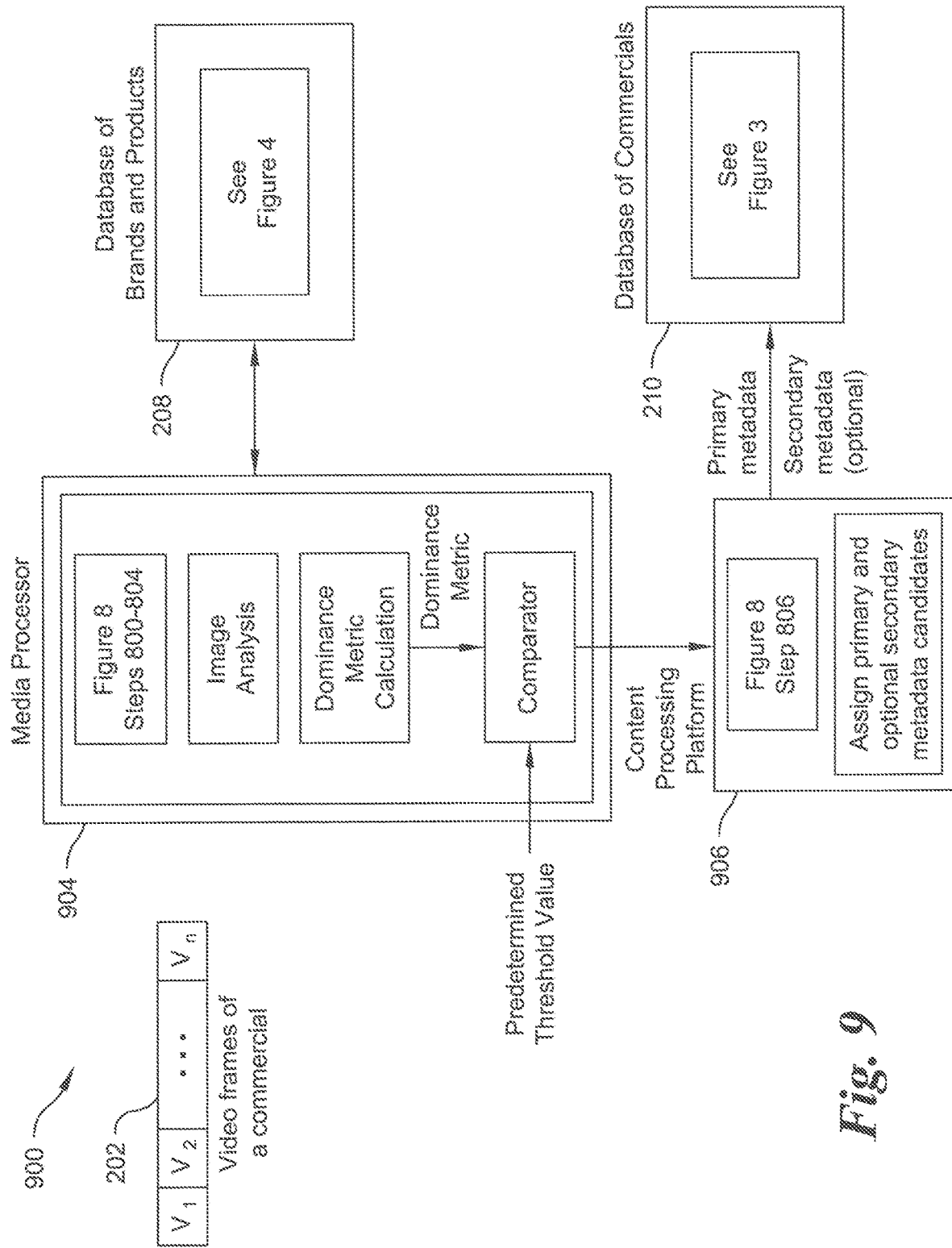
FIG. 9 is a schematic diagram of a system for implementing the preferred embodiment shown in FIG. 8.

FIG. 9 shows one preferred embodiment of a system 900 for implementing the process described above. Video frames ($V_1, V_2, \ldots V_n$) of commercial 202 are received by a media processor 904 which implements steps 800-804 described above with respect to FIG. 8 to calculate the dominance (relative size) metric and perform the comparison to the predetermined threshold percentage. The media processor 904 interacts with the database 208 of brand and product data shown in FIG. 4 to perform the image analysis of step 800. A content processing platform 906 then assigns a primary metadata candidate to the commercial when the dominance metric exceeds the predetermined threshold percentage (step 806 of FIG. 5). As discussed above, one of the functions of a conventional content processing platform is to verify that a video segment that was previously flagged as being a potential commercial is, in fact, a commercial, and then to assign metadata to the commercial using any combination of automated, semi-automated, or manual processes. However, in one preferred embodiment of the present invention, the video segment is presumed to be a commercial based on previous analysis using known techniques. Here, the content processing platform 906 still assigns at least the primary metadata as a result of the process described herein.

The primary metadata resulting from the process implemented in FIGS. 8 and 9 populates the primary metadata field in the same database 210 shown in FIG. 3.

Referring again to FIG. 9 and step 800 of FIG. 8, the media processor 904 performs image analysis on a plurality of the video frames to identify video frames that include one or more of identifiable product-related logos, brand-related logos, product-related text, or brand-related text which appear in the video frames. Conventional software, such GOOGLE Cloud Vision API and the database 208 of FIG. 4 may be used for such a purpose in the same manner as described above with respect to the persistence metric embodiment.

The dominance metric may be expressed in a plurality of different ways, and the scope of the present invention is not limited to any particular way. However, for illustrative purposes, one algorithm that may be used is as follows:
  1. Identify all image elements in a video frame.
  2. Classify all identified image elements as being either (i) brand or product-related image elements, or (ii) non-brand or non-product-related image elements.
  3. Identify a product or brand for the brand or product-related image elements.
  4. For each identified product or brand, calculate an average or median size of the related brand or product-related image elements.
  5. Calculate an average or median size of the non-brand and non-product-related image elements.
  6. For each identified product or brand, using the average or median sizes calculated above, calculate a relative size of the related brand or product-related image elements in comparison to the non-brand and non-product-related image elements. The dominance metric in this example is the relative size.
  7. Compare the relative size to the predetermined threshold value.

For example, it may be determined that a particular brand or product-related image element, such as a Toyota sign, is four times greater in size than the average size of the non-brand and non-product-related image elements (relative size=4×). The same image frame may include another logo-related image element, such as a Honda vehicle, which may be only about equal in size to the average size of the non-brand and non-product-related image elements (relative size=1×). As discussed below, the dominance metric can then be used to identify primary metadata candidates by comparing the dominance metric to a predetermined threshold value.

Figure 10:
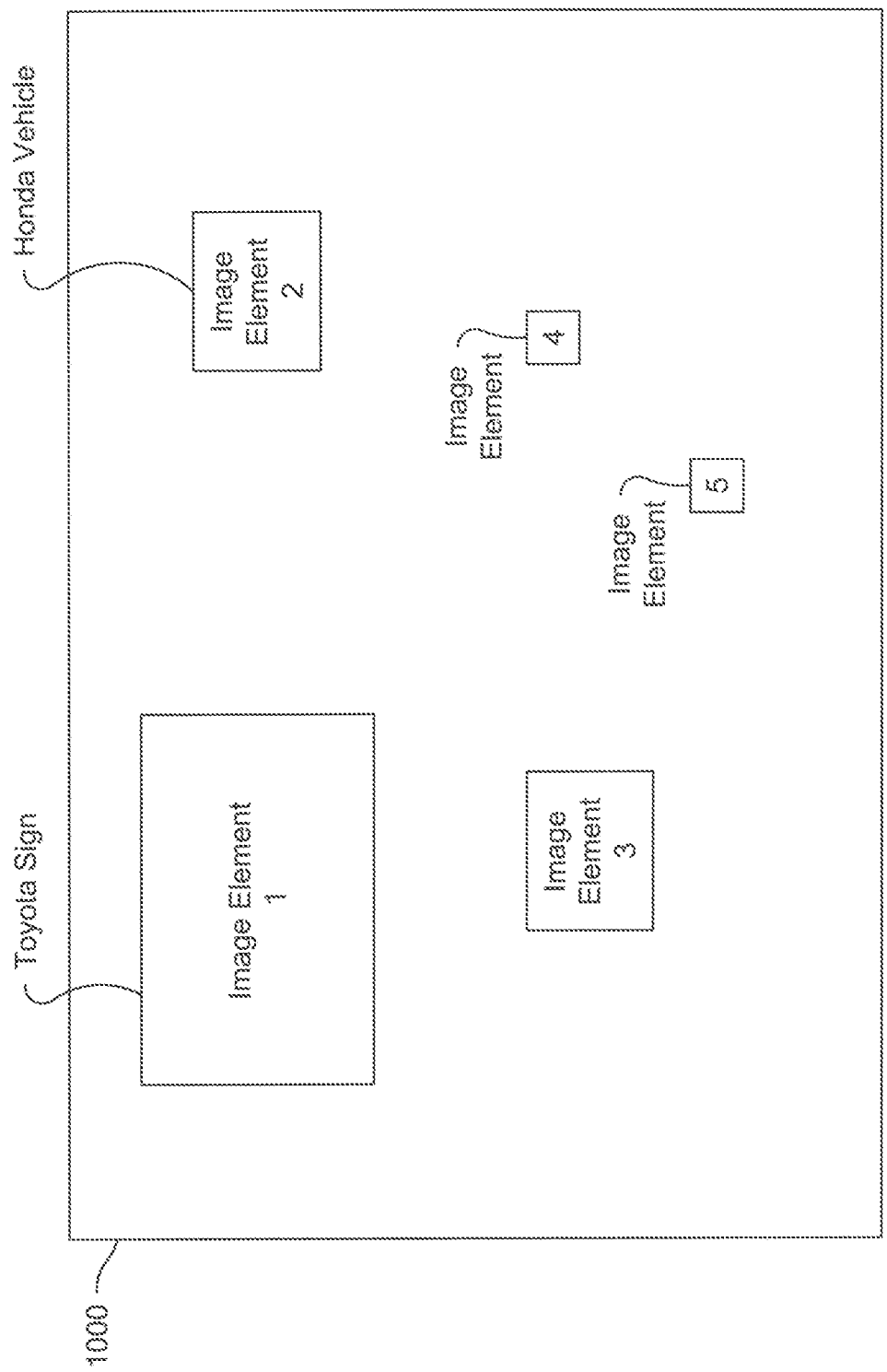
FIG. 10 is a video image frame for illustrating features of the preferred embodiment shown in FIGS. 8 and 9.

FIG. 10 shows an image frame 1000 that illustrates this example, wherein the Toyota sign is labeled as "image element 1" and the Honda vehicle is labeled as "image element 2." Other image elements were also identified in this video frame, labeled as "image element 3," "image element 4," and "image element 5," but these image elements are not associated with a product or brand, and thus are considered "non-brand or non-product-related" image elements.

Consider the following sample rule:

Rule: Declare primary metadata candidate when the average size of brand or product-related image elements for a particular brand or product, is at least three times (3×) greater in size than the average size of the non-brand and non-product-related image elements.

Result of Rule: "Toyota" is identified as a primary metadata candidate because the Toyota sign is more than three times greater in size than the average size of image elements 3, 4 and 5, which are the non-logo-related image elements (4× is greater than 3×). "Honda" is not identified as a primary metadata candidates because the Honda vehicle is not three times greater in size than the average size of image elements 3, 4 and 5, which are the non-logo-related image elements (The Honda vehicle is about equal in size to the average size of the image elements 3, 4 and 5, and thus 1× is not greater than 3×). If desired by the database provider, "Honda" may be flagged and stored as a secondary metadata candidate.

To simplify the example above, FIG. 10 does not include any image elements associated with overlaid text, such as image element 6 shown in FIG. 7. If it included such image elements, the average size calculations would change and the rule would have to be retested using the new average size calculations. In one preferred embodiment, any overlaid text is simply treated as another image element to be used in the calculation of the average or median size calculations.

The exact algorithm and the ideal predetermined threshold value are selected so as to yield sufficiently acceptable results.

D. Temporal Metric

Figure 11:
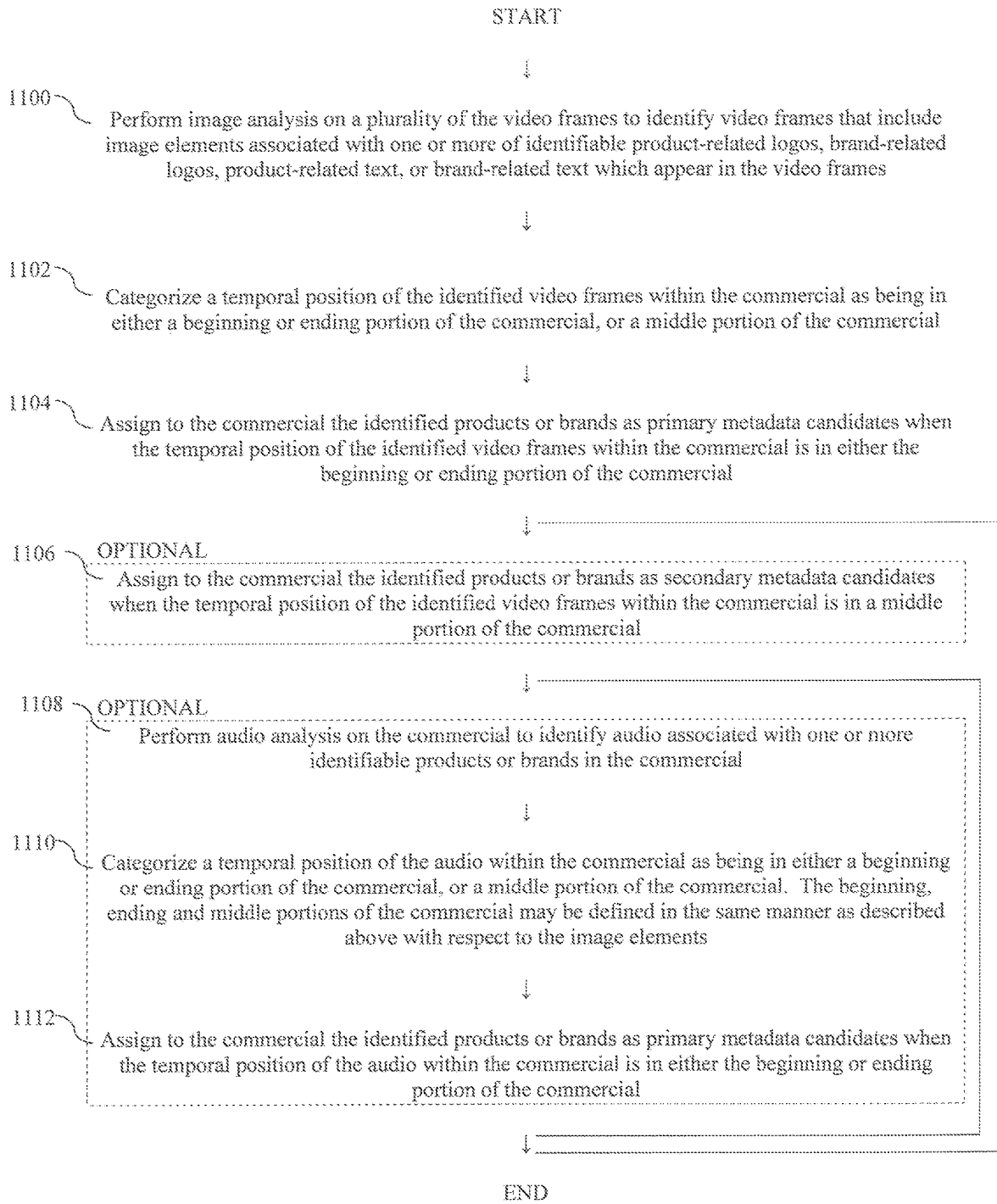
FIG. 11 is a flowchart for implementing a fourth preferred embodiment of the present invention.

FIG. 11 is a flowchart of one preferred embodiment of the present invention that provides an automated method of identifying primary metadata candidates associated with a commercial and assigning the primary metadata candidates to the commercial, wherein the commercial is defined by video frames. In one preferred embodiment, the method operates as follows:

STEP 1100: Perform image analysis on a plurality of the video frames to identify video frames that include image elements associated with one or more of identifiable product-related logos, brand-related logos, product-related text, or brand-related text which appear in the video frames.

STEP 1102: Categorize a temporal position of the identified video frames within the commercial as being in either a beginning or ending portion of the commercial, or a middle portion of the commercial.

STEP 1104: Assign to the commercial the identified products or brands as primary metadata candidates when the temporal position of the identified video frames within the commercial is in either the beginning or ending portion of the commercial.

STEP 1106 (optional): Assign to the commercial the identified products or brands as secondary metadata candidates when the temporal position of the identified video frames within the commercial is in a middle portion of the commercial.

STEP 1108 (optional): Perform audio analysis on the commercial to identify audio associated with one or more identifiable products or brands in the commercial.

STEP 1110 (optional): Categorize a temporal position of the audio within the commercial as being in either a beginning or ending portion of the commercial, or a middle portion of the commercial. The beginning, ending and middle portions of the commercial may be defined in the same manner as described above with respect to the image elements.

STEP 1112 (optional): Assign to the commercial the identified products or brands as primary metadata candidates when the temporal position of the audio within the commercial is in either the beginning or ending portion of the commercial.

STEPS 1108-1112 are either performed as a group or are all skipped.

Regarding steps 1100 and 1108, the image analysis and optional audio analysis may be performed on all of the video frames in the commercial, or on a sampled subset of the video frames in the commercial. The sampled subset of video frames may be evenly sampled throughout the length of the commercial.

Figure 12:
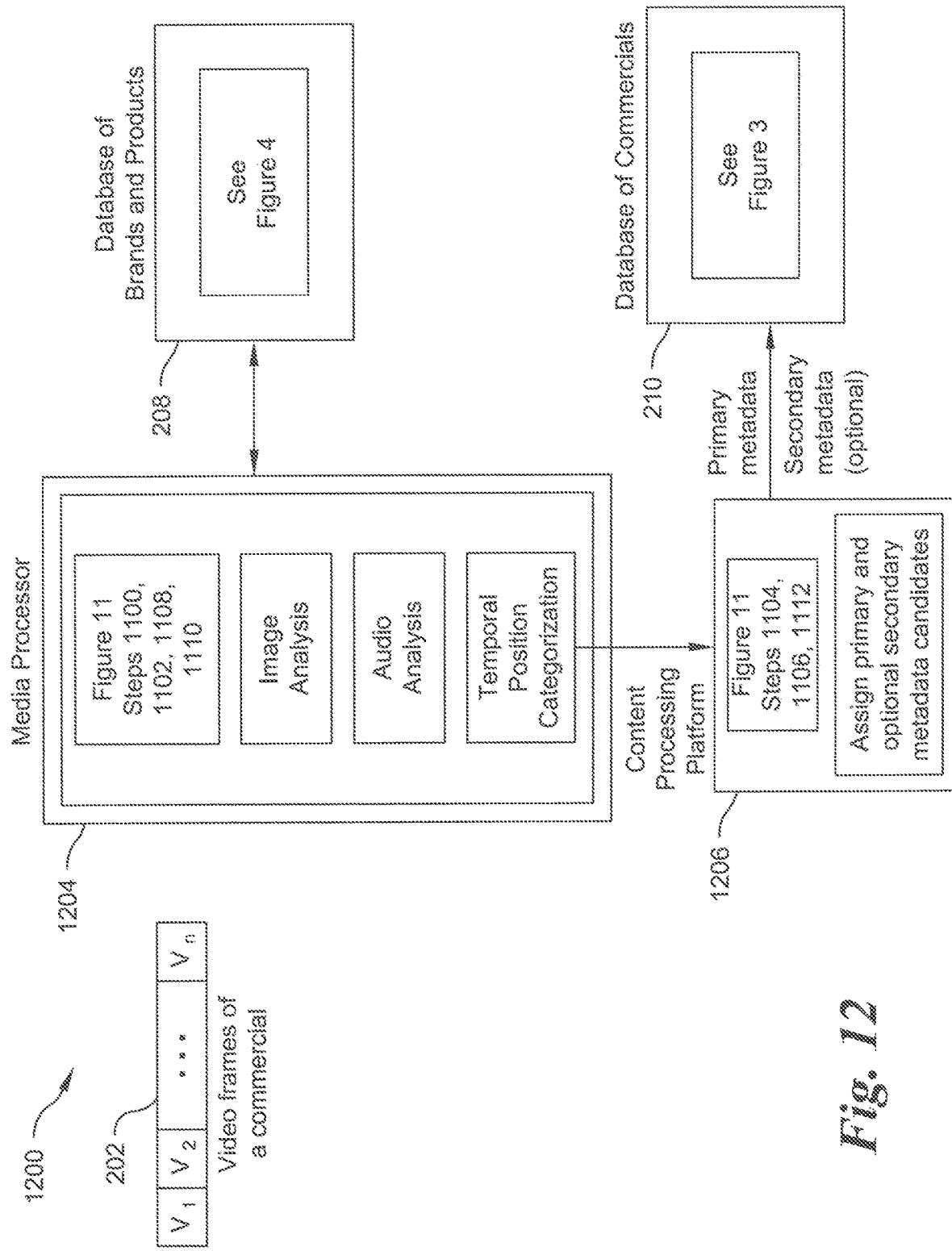
FIG. 12 is a schematic diagram of a system for implementing the preferred embodiment shown in FIG. 11.

FIG. 12 shows one preferred embodiment of a system 1200 for implementing the process described above. Video frames ($V_1$, $V_2$, . . . $V_n$) of commercial 202 are received by a media processor 1204 which implements steps 1100, 1102, 1108 and 1110 described above with respect to FIG. 11 to perform the image analysis, the optional audio analysis, and the temporal position categorization. The media processor 1204 interacts with the database 208 of brand and product data shown in FIG. 4 to perform the image analysis of step 1100. A content processing platform 1206 then assigns one or more primary metadata candidates, and, optionally, one or more secondary metadata candidates, to the commercial based on the result of the temporal position categorization (step 1104 of FIG. 11). As discussed above, one of the functions of a conventional content processing platform is to verify that a video segment that was previously flagged as being a potential commercial is, in fact, a commercial, and then to assign metadata to the commercial using any combination of automated, semi-automated, or manual processes. However, in one preferred embodiment of the present invention, the video segment is presumed to be a commercial based on previous analysis using known techniques. Here, the content processing platform 1206 still assigns at least the primary metadata as a result of the process described herein.

The primary metadata and secondary metadata resulting from the process implemented in FIGS. 11 and 12 populate the primary metadata field in the same database 210 shown in FIG. 3.

Referring again to FIG. 12 and step 1100 of FIG. 11, the media processor 1204 performs image analysis on a plurality of the video frames to identify video frames that include one or more of identifiable product-related logos, brand-related logos, product-related text, or brand-related text which appear in the video frames. Conventional software, such GOOGLE Cloud Vision API and the database 208 of FIG. 4 may be used for such a purpose in the same manner as described above with respect to the persistence metric embodiment.

Referring again to FIG. 12 and step 1108 of FIG. 11, the media processor 1204 performs audio analysis on the commercial to identify audio associated with one or more identifiable products or brands in the commercial. In one preferred embodiment, the media processor 1204 may capture closed captioned text in the commercial. (Closed captioning is the visual display of the audio portion of video programming.) While there is no requirement in the United States that all TV commercials have closed captioning, most commercials use closed captioning. Alternatively, a speech-to-text module is included in the media processor 1204 to capture the audio. In both cases, the detected text is compared to the text in the database of FIG. 4 for any potential matches.

The temporal position categorization may be expressed in a plurality of different ways, and the scope of the present invention is not limited to any particular way. However, for illustrative purposes, one algorithm that may be used is as follows:

1. The beginning and ending portion of the commercial are defined by about the first 20% and about the last 20% of the video frames in the commercial.

2. The middle portion of the commercial is defined by the video frames in the commercial that are between about the first 20% and about the last 20% of the video frames in the commercial.

The scope of the invention is not limited to any specific percentage. The beginning and ending portions may be defined by about the first 1% to about the first third (33%) and about the last 1% to about the last third (33%) of the video frames of the commercial. The percentages that define the beginning and the ending portions do not necessarily have to be equal values.

Figure 13:
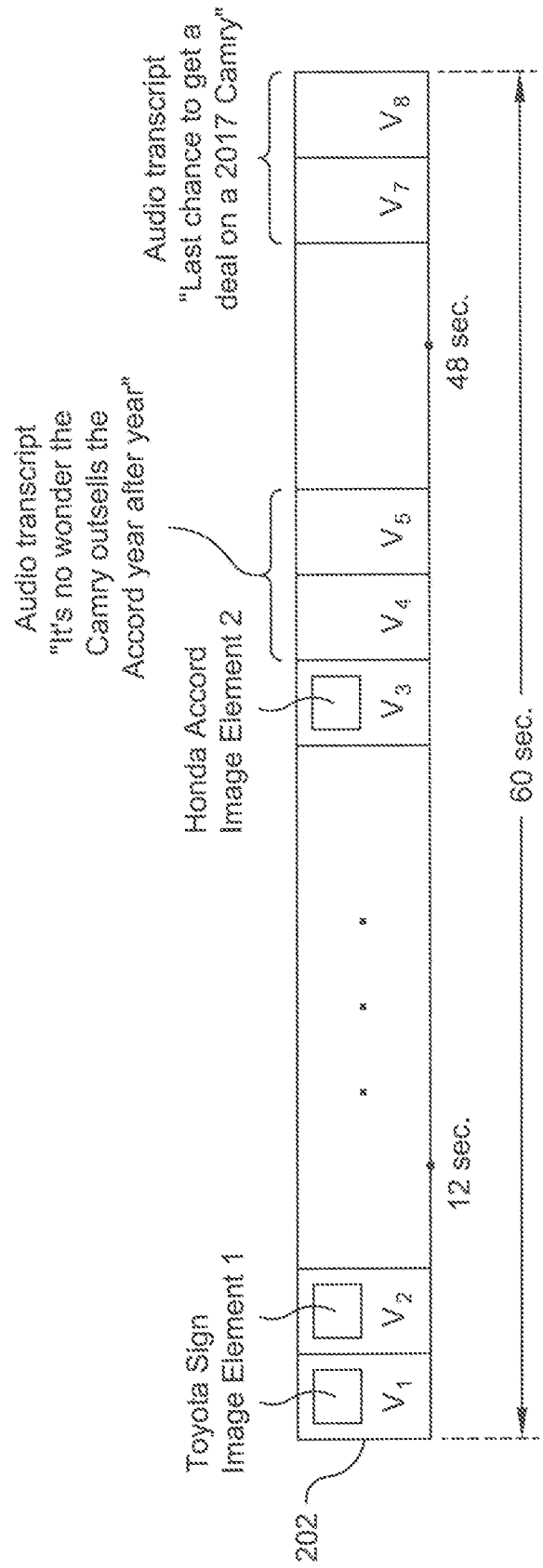
FIG. 13 shows video frames of commercial for illustrating features of the preferred embodiment shown in FIGS. 11 and 12.

FIG. 13 illustrates video frames ($V_1$, $V_2$, ... Vg) of a 60 second commercial 202. The video frames are not to scale and adjacent video frames are not necessarily directly adjacent. The video frames represent only a sampling of video frames within the general time window. Likewise, the audio transcript is not to scale. A typical frame rate for broadcast TV is 25 or 30 frames per second, so a single word would typically span many frames.

Video frames $V_1$ and $V_2$ appear in the first 12 seconds of the commercial, video frames $V_7$ and $V_8$ appear in the last 12 seconds of the commercial, and video frames $V_3$, $V_4$ and $V_5$ appear in between these time frames. Video frames $V_1$ and $V_2$ both include an image element 1 of a Toyota sign, similar to that shown in FIGS. 7 and 10. Video frame $V_3$ shows an image element 2 of a Honda Accord, similar to that shown in FIGS. 7 and 10.

Consider the following sample rule:

Rule: Declare primary metadata candidate when an image element having an identified product or brand appears in a video frame that is in the first 20% or the last 20% of the commercial. For a 60 second commercial, this means that the image element must appear in the first 12 seconds or the last 12 seconds of the commercial.

Result of Rule: "Toyota" is identified as a primary metadata candidate because the Toyota sign appears within the first 12 seconds of the commercial, which is within the first 20% of the commercial's video frames. "Honda" and "Accord" are not identified as a primary metadata candidates because the Honda Accord does not appear within the first 20% of the commercial's video frames. If desired by the database provider, "Honda" and "Accord" may be flagged and stored as a secondary metadata candidate.

Regarding the optional audio analysis, FIG. 13 shows that the audio transcript during video frames $V_4$ and $V_5$ of the commercial reads "It's no wonder the Camry outsells the Accord year after year." These video frames appear between the first 20% and the last 20% of the commercial's video frames. The audio transcript during video frames $V_7$ and Vg of the commercial reads "Last chance to get a deal on a 2017 Camry."

Consider the following sample rule:

Rule: Declare primary metadata candidate when audio having an identified product or brand is spoken in the first 20% or the last 20% of the commercial's video frames.

Result of Rule: "Camry" is identified as a primary metadata candidate because the Camry appears in the audio within the last 12 seconds of the commercial, which is within the last 20% of the commercial's video frames. "Honda" and "Accord" are not identified as a primary metadata candidates because the audio which refers to the Honda Accord does not appear within the first 20% of the commercial's video frames or last 20% of the commercial's video frames. If desired by the database provider, "Honda" and "Accord" may be flagged and stored as a secondary metadata candidate.

E. Audio and Video Consistency

Figure 14:
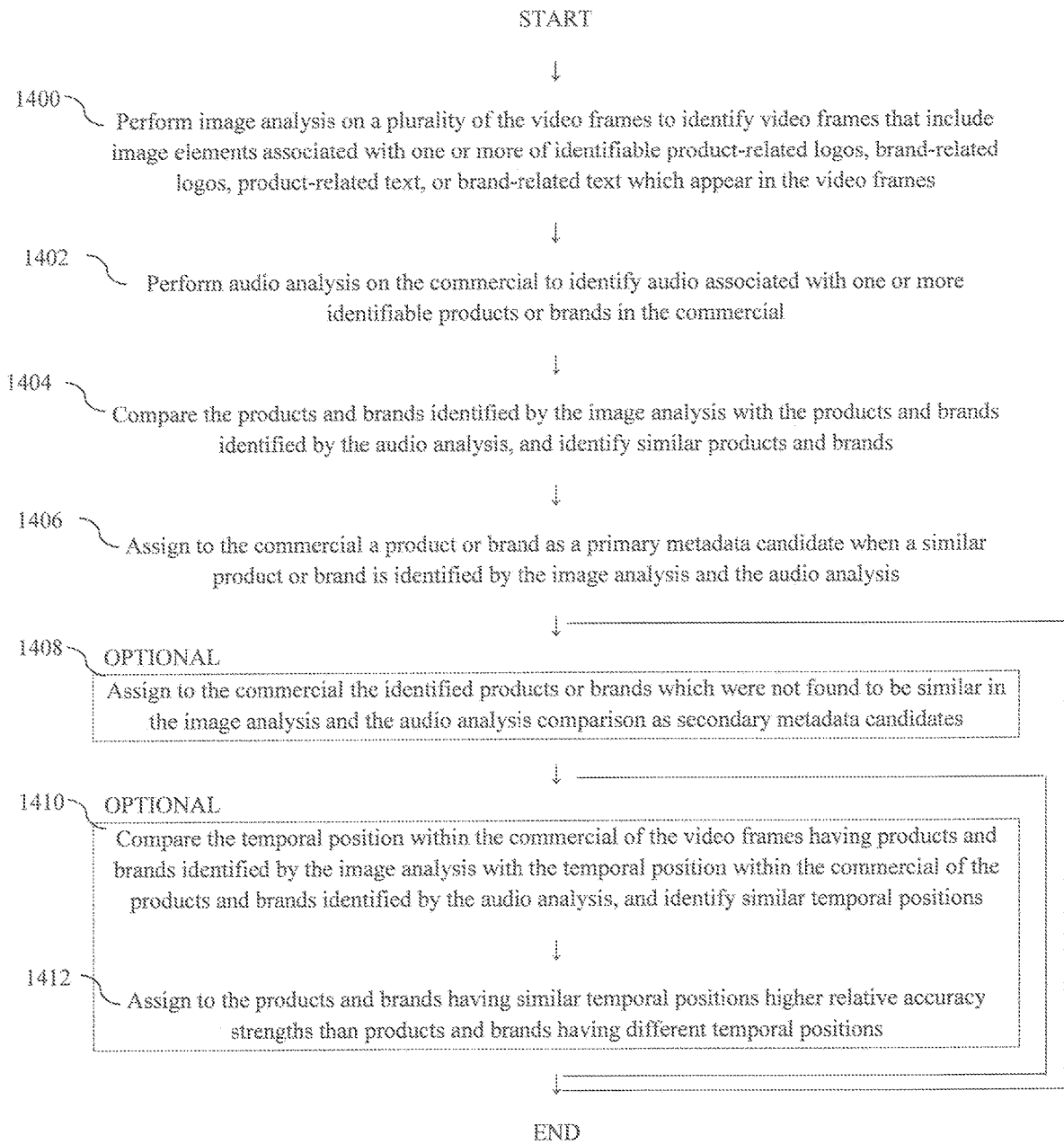
FIG. 14 is a flowchart for implementing a fifth preferred embodiment of the present invention.

FIG. 14 is a flowchart of one preferred embodiment of the present invention that provides an automated method of identifying primary metadata candidates associated with a commercial and assigning the primary metadata candidates to the commercial, wherein the commercial is defined by video frames. In one preferred embodiment, the method operates as follows:

STEP 1400: Perform image analysis on a plurality of the video frames to identify video frames that include image elements associated with one or more of identifiable product-related logos, brand-related logos, product-related text, or brand-related text which appear in the video frames.

STEP 1402: Perform audio analysis on the commercial to identify audio associated with one or more identifiable products or brands in the commercial.

STEP 1404: Compare the products and brands identified by the image analysis with the products and brands identified by the audio analysis, and identify similar products and brands.

STEP 1406: Assign to the commercial a product or brand as a primary metadata candidate when a similar product or brand is identified by the image analysis and the audio analysis.

STEP 1408 (optional): Assign to the commercial the identified products or brands which were not found to be similar in the image analysis and the audio analysis comparison as secondary metadata candidates.

STEP 1410 (optional): Compare the temporal position within the commercial of the video frames having products and brands identified by the image analysis with the temporal position within the commercial of the products and brands identified by the audio analysis, and identify similar temporal positions.

STEP 1412 (optional): Assign to the products and brands having similar temporal positions higher relative accuracy strengths than products and brands having different temporal positions.

STEPS 1410-1412 are either performed as a group or are both skipped. "Relative accuracy strengths" is a measure of the likelihood that the primary metadata candidates are correctly identified. For example, the relative accuracy strengths may be characterized as follows:

Similar temporal position=higher likelihood: video ID and audio ID overlap with each other, or occur within 2% of each other (i.e., 2% of the video frames, which would be 1.2 seconds for a 60 minute commercial). Assign a higher relative accuracy strength.

Different temporal position=lower likelihood; video ID and audio ID occur within 2% and 10% of each other (i.e., between 2% and 10% of the video frames, which would be between 1.2 seconds and 10 seconds for a 60 minute commercial). Assign a lower relative accuracy strength.

Very different temporal position=lowest likelihood: video ID and audio ID occur more than 10% away from each other (i.e., more than 10% of the video frames, which would be more than 10 seconds away from each other for a 60 minute commercial). Assign an even lower relative accuracy strength.

The scope of the present invention includes other algorithms for calculating relative accuracy strengths which rely upon a temporal factor regarding the location within a commercial of a product or brand as represented by an image element and the location within the commercial of the same product or brand as represented by audio.

Regarding steps 1400 and 1402, the image analysis and optional audio analysis may be performed on all of the video frames in the commercial, or on a sampled subset of the video frames in the commercial. The sampled subset of video frames may be evenly sampled throughout the length of the commercial. Other embodiments are within the scope of the present invention, such analyzing only a subset of video frames in a particular portion of the commercial.

Figure 15:
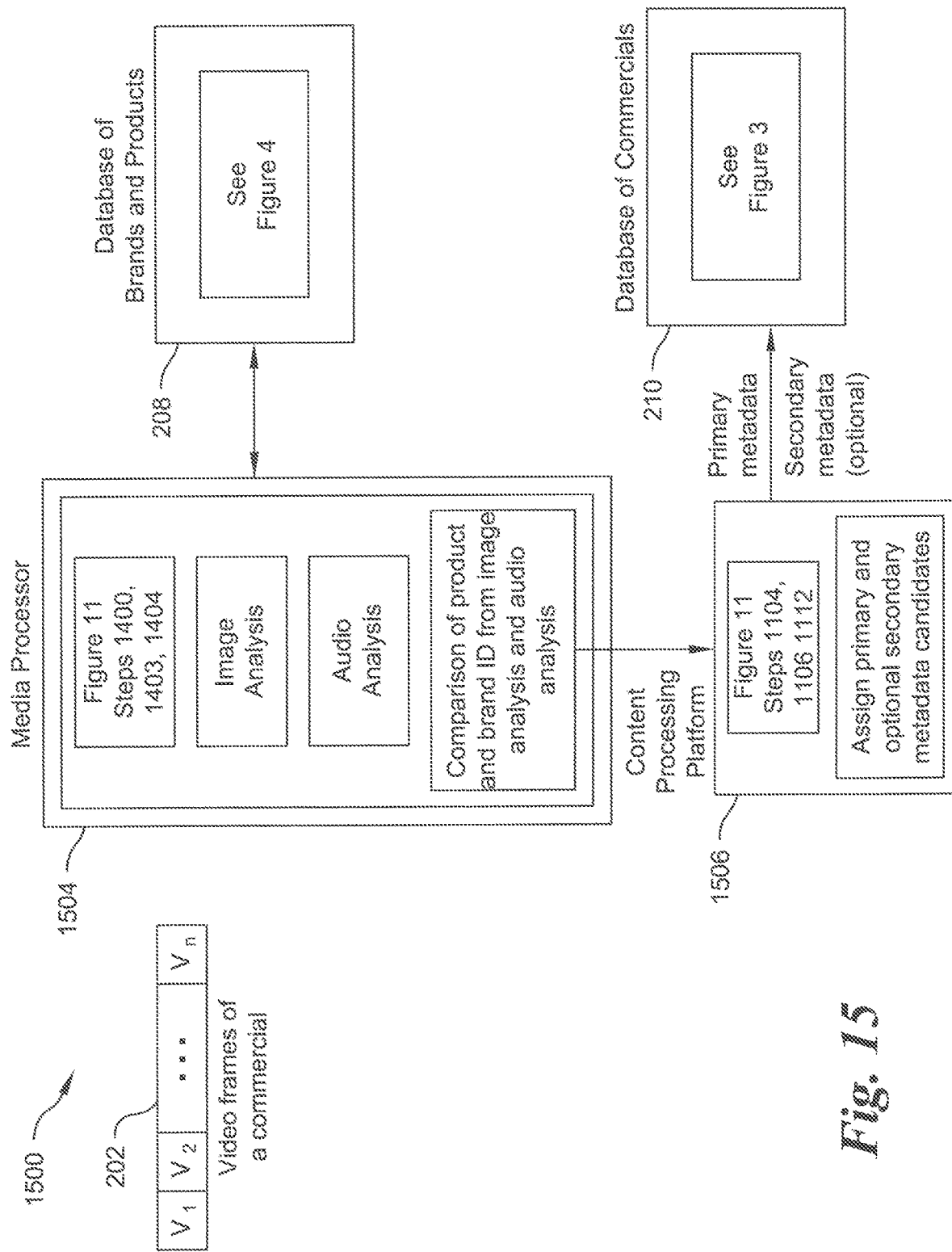
FIG. 15 is a schematic diagram of a system for implementing the preferred embodiment shown in FIG. 4.

FIG. 15 shows one preferred embodiment of a system 1500 for implementing the process described above. Video frames ($V_1, V_2, \ldots V_n$) of commercial 202 are received by a media processor 1504 which implements steps 1400, 1402 and 1404 described above with respect to FIG. 14 to perform the image analysis, the audio analysis, the comparison of the product and brand identification from the image analysis and audio analysis, and the optional temporal comparison. The media processor 1504 interacts with the database 208 of brand and product data shown in FIG. 4 to perform the image analysis of step 1400. A content processing platform 1506 then assigns one or more primary metadata candidates, and, optionally, one or more secondary metadata candidates, to the commercial based on the comparison results. As discussed above, one of the functions of a conventional content processing platform is to verify that a video segment that was previously flagged as being a potential commercial is, in fact, a commercial, and then to assign metadata to the commercial using any combination of automated, semi-automated, or manual processes. However, in one preferred embodiment of the present invention, the video segment is presumed to be a commercial based on previous analysis using known techniques. Here, the content processing platform 1506 still assigns at least the primary metadata as a result of the process described herein.

The primary metadata and secondary metadata resulting from the process implemented in FIGS. 14 and 15 populate the primary metadata field in the same database 210 shown in FIG. 3.

Referring again to FIG. 15 and step 1400 of FIG. 11, the media processor 1504 performs image analysis on a plurality of the video frames to identify video frames that include one or more of identifiable product-related logos, brand-related logos, product-related text, or brand-related text which appear in the video frames. Conventional software, such GOOGLE Cloud Vision API and the database 208 of FIG. 4 may be used for such a purpose in the same manner as described above with respect to the persistence metric embodiment.

Referring again to FIG. 15 and step 1402 of FIG. 14, the media processor 1504 performs audio analysis on the commercial to identify audio associated with one or more identifiable products or brands in the commercial. In one preferred embodiment, the media processor 1504 may capture closed captioned text in the commercial. Alternatively, a speech-to-text module is included in the media processor 1504 to capture the audio. In both cases, the detected text is compared to the text in the database of FIG. 4 for any potential matches.

Figure 16:
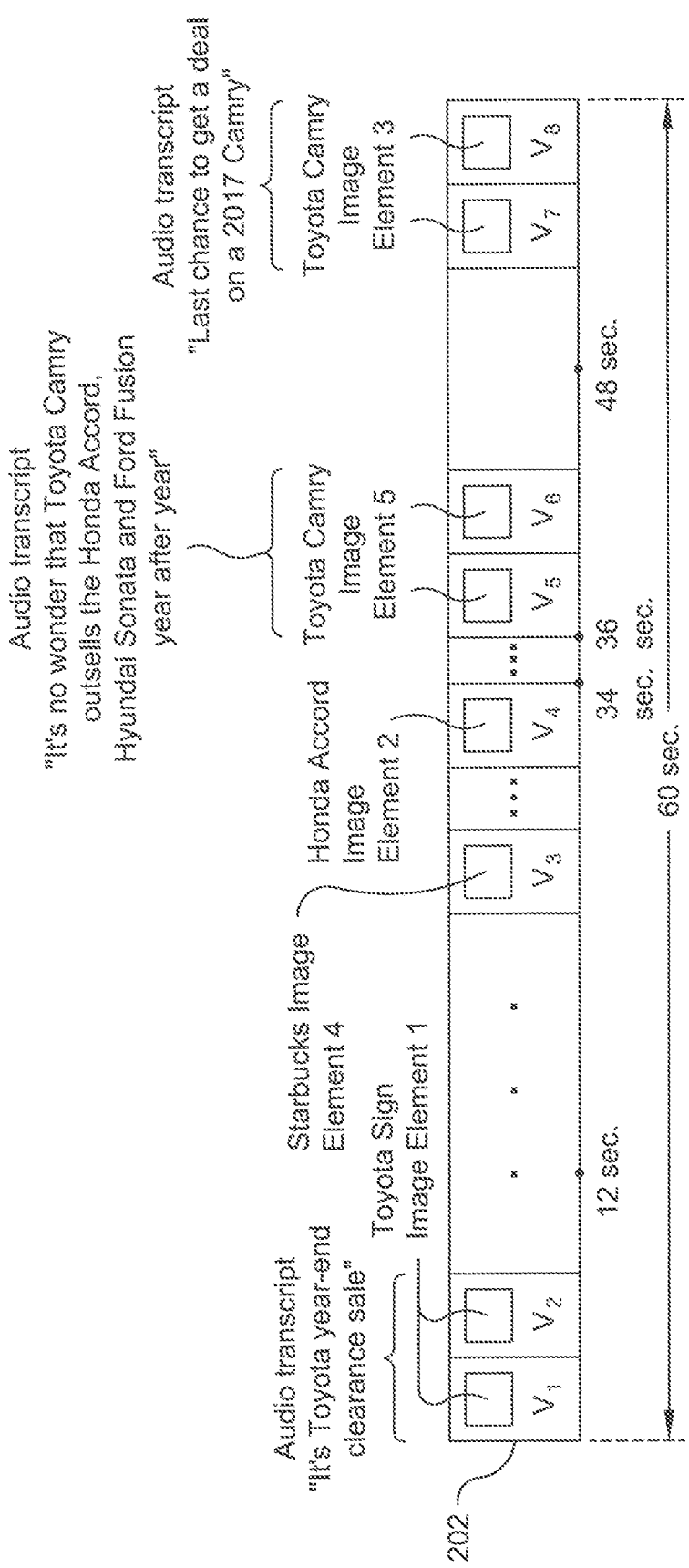
FIG. 16 shows video frames of commercial for illustrating features of the preferred embodiment shown in FIGS. 14 and 15.

FIG. 16 illustrates video frames ($V_1, V_2, \ldots V_9$) of a 60 second commercial 202. The video frames are not to scale and adjacent video frames are not necessarily directly adjacent. The video frames represent only a sampling of video frames within the general time window. FIG. 16 shows the same items as FIG. 13 and includes additional items to illustrate this embodiment. Likewise, the audio transcript is not to scale. A typical frame rate for broadcast TV is 25 or 30 frames per second, so a single word would typically span many frames.

The image analysis performed on the commercial 202 results in the following identified products and brands:
  i. Camry (image element 3 in $V_7$ and $V_8$; image element 5 in $V_5$ and $V_6$)
  ii. Accord (image element 2 in $V_4$)
  iii. Toyota (image element 1 in $V_1$ and $V_2$; image element 5 in $V_5$ and $V_6$; image element 3 in $V_7$ and $V_8$)
  iv. Honda (image element 2 in $V_4$)
  v. Starbucks (image element 4 in $V_3$)

The audio analysis performed on the commercial 202 results in the following identified products and brands:
  i. Camry (audio from $V_5$, $V_6$, $V_7$ and $V_8$)
  ii. Accord (audio from $V_5$ and $V_6$)
  iii. Sonata (audio from $V_5$ and $V_6$)
  iv. Fusion (audio from $V_5$ and $V_6$)
  v. Toyota (audio from $V_1$, $V_2$, $V_5$ and $V_6$)
  vi. Honda (audio from $V_5$ and $V_6$)
  vii. Hyundai (audio from $V_5$ and $V_6$)
  viii. Ford (audio from $V_5$ and $V_6$)

The comparison step 1404 identifies only the following products and brands as being identified by both the video analysis and the audio analysis:
  i. Camry
  ii. Accord
  iii. Toyota
  iv. Honda Accordingly, these products and brands are primary metadata candidates.

If desired by the database provider, the remaining identified products and brands (i.e., those which were not identified by both the video analysis and the audio analysis) may be flagged and stored as secondary metadata candidates.

If the optional temporal position analysis is performed, it may be possible to eliminate "Honda" and "Accord" as primary metadata candidates. As discussed below, this particular commercial is a commercial for Toyota and Camry, not Honda or Accord, but the initial analysis identified all four of these products and brands as being primary metadata candidates.

Consider again the example of FIG. 16. Referring to video frames $V_5$ and $V_6$, the video image for Toyota Camry overlaps with the audio transcript that refers to Toyota Camry. This meets the criterion for being in a "similar temporal position." To the contrary, there is no overlap between the video frame $V_4$ which has an image element of a Honda Accord and the video frames $V_5$ and $V_6$ which correspond to the time frame when "Honda Accord" is spoken. In fact, there is about a 2 second difference between video frames $V_4$ and $V_5$. This meets the criterion for being in a "different temporal position." Accordingly, "Toyota" and "Camry" have a higher relative accuracy strength than "Honda" and "Accord," and thus "Toyota" and "Camry" are better candidates than "Honda" and "Accord" for being flagged as primary metadata.

F. Final Selection of Primary Metadata Referring again to FIGS. 2, 3, 6, 9, 12 and 15, the primary metadata candidates may be either used without further analysis to populate the primary metadata for the commercial, or the commercial may be subjected to additional forms of analysis, either automatically, semi-automatically, or manually, to determine if the primary metadata candidates should become the actual primary metadata. For example, any combination of the techniques described above may be employed, and the candidates may be automatically compared to each other. If the same candidates are identified by multiple techniques, these candidates are used to populate the primary metadata for the commercial. If candidates from one technique are not identified by any of the other techniques, additional analysis, such as manual review, may be necessary to confirm the accuracy of these candidates for the primary metadata. Based on previous experience regarding the accuracy of the different techniques, different weightings may be placed on the candidates for each of the techniques when comparing candidates across techniques for similarity.

The present invention may be implemented with any combination of hardware and software. If implemented as a computer-implemented apparatus, the present invention is implemented using means for performing all of the steps and functions described above.

When implemented in software, the software code for the media processors 204, 604, 904, 1204, 1504 can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein for the media processors 204, 604, 904, 1204, 1504 may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The media processor used in the media processors 204, 604, 904, 1204, 1504 is not a general-purpose computer, but instead is a specialized computer machine that performs a myriad of video processing functions that are not native to a general-purpose computer, absent the addition of specialized programming.

The media processors 204, 604, 904, 1204, 1504, databases 208, 210, and content processing platforms 206, 606, 906, 1206, 1506 may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method of identifying primary metadata candidates associated with a commercial and assigning the primary metadata candidates to the commercial, wherein the commercial is defined by video frames, the method comprising:
   (a) performing image analysis using a media processor on a plurality of the video frames to identify video frames that include image elements associated with one or more of identifiable product-related logos, brand-related logos, product-related text, or brand-related text which appear in the video frames;

(b) categorizing, by the media processor, a temporal position of the identified video frames within the commercial as being in either a beginning or ending portion of the commercial, or a middle portion of the commercial;

(c) assigning to the commercial, by a content processing platform, the identified products or brands as primary metadata candidates when the temporal position of the identified video frames within the commercial is in either the beginning or ending portion of the commercial, wherein the primary metadata candidates directly identify candidates for the product and/or brand being advertised in the commercial;

(d) populating a field of a database table with primary metadata regarding their respective commercials using the primary metadata candidates that directly identify candidates for the product and/or brand being advertised in the commercial, wherein the primary metadata in the database table are the primary metadata candidates from the identified products or brands having the temporal position of the identified video frames within the commercial being at either the beginning or ending portion of the commercial;

(e) performing audio analysis using the media processor on the commercial to identify audio associated with one or more identifiable products or brands in the commercial; and (f) categorizing, by the media processor, a temporal position of the audio within the commercial as being in either a beginning or ending portion of the commercial, or a middle portion of the commercial, wherein step (c) further comprises assigning to the commercial, by the content processing platform, the identified products or brands as primary metadata candidates when the temporal position of the audio within the commercial is in either the beginning or ending portion of the commercial, and wherein step (c) further comprises assigning to the commercial, by the content processing platform, the identified products or brands as secondary metadata candidates when the temporal position of the audio within the commercial is in a middle portion of the commercial.

2. An automated method of identifying primary metadata candidates associated with a commercial and assigning the primary metadata candidates to the commercial, wherein the commercial is defined by video frames, the method comprising:

(a) performing image analysis using a media processor on a plurality of the video frames to identify video frames that include image elements associated with one or more of identifiable product-related logos, brand-related logos, product-related text, or brand-related text which appear in the video frames;

(b) categorizing, by the media processor, a temporal position of the identified video frames within the commercial as being in either a beginning or ending portion of the commercial, or a middle portion of the commercial;

(c) assigning to the commercial, by a content processing platform, the identified products or brands as primary metadata candidates when the temporal position of the identified video frames within the commercial is in either the beginning or ending portion of the commercial, wherein the primary metadata candidates directly identify candidates for the product and/or brand being advertised in the commercial; and (d) populating a field of a database table with primary metadata regarding their respective commercials using the primary metadata candidates that directly identify candidates for the product and/or brand being advertised in the commercial, wherein the primary metadata in the database table are the primary metadata candidates from the identified products or brands having the temporal position of the identified video frames within the commercial being at either the beginning or ending portion of the commercial, and wherein step (c) further comprises assigning to the commercial, by the content processing platform, the identified products or brands as secondary metadata candidates when the temporal position of the identified video frames within the commercial is in a middle portion of the commercial.

3. An automated system for identifying primary metadata candidates associated with a commercial and assigning the primary metadata candidates to the commercial, wherein the commercial is defined by video frames, the system comprising:

(a) a media processor configured to:

(i) perform image analysis on a plurality of the video frames to identify video frames that include image elements associated with one or more of identifiable product-related logos, brand-related logos, product-related text, or brand-related text which appear in the video frames, and (ii) categorize a temporal position of the identified video frames within the commercial as being in either a beginning or ending portion of the commercial, or a middle portion of the commercial;

(b) a content processing platform configured to assign to the commercial the identified products or brands as primary metadata candidates when the temporal position of the identified video frames within the commercial is in either the beginning or ending portion of the commercial, wherein the primary metadata candidates directly identify candidates for the product and/or brand being advertised in the commercial; and (c) a database table including a field populated with primary metadata regarding their respective commercials using the primary metadata candidates that directly identify candidates for the product and/or brand being advertised in the commercial, wherein the primary metadata in the database table are the primary metadata candidates from the identified products or brands having the temporal position of the identified video frames within the commercial being at either the beginning or ending portion of the commercial, wherein the media processor is further configured to perform audio analysis using the media processor on the commercial to:

(iii) identify audio associated with one or more identifiable products or brands in the commercial, and (iv) categorize a temporal position of the audio within the commercial as being in either a beginning or ending portion of the commercial, or a middle portion of the commercial, wherein the content processing platform is further configured to assign to the commercial the identified products or brands as primary metadata candidates when the temporal position of the audio within the commercial is in either the beginning or ending portion of the commercial, and wherein the content processing platform is further configured to assign to the commercial the identified products or brands as secondary metadata candidates when the temporal position of the audio within the commercial is in a middle portion of the commercial.

4. An automated system for identifying primary metadata candidates associated with a commercial and assigning the primary metadata candidates to the commercial, wherein the commercial is defined by video frames, the system comprising:

(a) a media processor configured to:
   (i) perform image analysis on a plurality of the video frames to identify video frames that include image elements associated with one or more of identifiable product-related logos, brand-related logos, product-related text, or brand-related text which appear in the video frames, and
   (ii) categorize a temporal position of the identified video frames within the commercial as being in either a beginning or ending portion of the commercial, or a middle portion of the commercial;

(b) a content processing platform configured to assign to the commercial the identified products or brands as primary metadata candidates when the temporal position of the identified video frames within the commercial is in either the beginning or ending portion of the commercial, wherein the primary metadata candidates directly identify candidates for the product and/or brand being advertised in the commercial; and (c) a database table including a field populated with primary metadata regarding their respective commercials using the primary metadata candidates that directly identify candidates for the product and/or brand being advertised in the commercial, wherein the primary metadata in the database table are the primary metadata candidates from the identified products or brands having the temporal position of the identified video frames within the commercial being at either the beginning or ending portion of the commercial, and wherein the content processing platform is further configured to assign to the commercial the identified products or brands as secondary metadata candidates when the temporal position of the identified video frames within the commercial is in a middle portion of the commercial.

\* \* \* \* \*